United States Patent
Jayanti Venkata et al.

(10) Patent No.: US 9,749,311 B2
(45) Date of Patent: Aug. 29, 2017

(54) POLICY BASED COMPLIANCE MANAGEMENT AND REMEDIATION OF DEVICES IN AN ENTERPRISE SYSTEM

(71) Applicant: Oracle International Corporation, Redwood Shores, CA (US)

(72) Inventors: Bhagavati Kumar Jayanti Venkata, Bangalore (IN); Harsh Maheshwari, Indore (IN); Mohamad Raja Gani Mohamad Abdul, Belmont, CA (US); Parthipan Kandasamy, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 241 days.

(21) Appl. No.: 14/690,045

(22) Filed: Apr. 17, 2015

(65) Prior Publication Data

US 2016/0088021 A1    Mar. 24, 2016

Related U.S. Application Data

(60) Provisional application No. 62/054,544, filed on Sep. 24, 2014.

(51) Int. Cl.
*H04L 29/06* (2006.01)
*G06F 9/445* (2006.01)
(Continued)

(52) U.S. Cl.
CPC ............ *H04L 63/0823* (2013.01); *G06F 8/60* (2013.01); *G06F 8/61* (2013.01); *G06F 8/71* (2013.01);
(Continued)

(58) Field of Classification Search
CPC ....... H04L 63/20; H04L 63/105; H04L 67/10; H04L 41/082; H04L 41/5096;
(Continued)

(56) References Cited

U.S. PATENT DOCUMENTS 7,080,078 B1    7/2006    Slaughter et al.
7,620,001 B2    11/2009   Ganji
(Continued)

FOREIGN PATENT DOCUMENTS

EP    2 282 477 A1    2/2011
EP    2 676 497 A1    12/2013
(Continued)

OTHER PUBLICATIONS

International Application No. PCT/US2015/026596; Written Opinion mailed on Aug. 22, 2016, 7 pages.
(Continued)

*Primary Examiner* — Baotran N To
(74) *Attorney, Agent, or Firm* — Kilpatrick Townsend & Townsend LLP

(57) ABSTRACT

The present disclosure relates generally to managing compliance of remote devices that access an enterprise system. More particularly, techniques are disclosed for using a compliance policy to manage remediation of non-compliances of remote devices that access an enterprise system. A device access management system may be implemented to automate remediation of non-compliances of remote devices accessing an enterprise system. Remediation may be controlled based on different levels of non-compliance, each defined by one or more different non-compliances. In some embodiments, a level of non-compliance may be conditionally defined by one or more user roles for which non-compliance is assessed. Access to computing resources of an enterprise system may be controlled for a remote device based on compliance of the remote device. Access may be inhibited for those resources not permitted during a time period of a non-compliance.

19 Claims, 12 Drawing Sheets

(51) Int. Cl.

| | | |
|---|---|---|
| *G06F 9/44* | (2006.01) | |
| *G06F 21/45* | (2013.01) | |
| *G06F 21/30* | (2013.01) | |
| *H04L 12/24* | (2006.01) | |
| *G06F 21/31* | (2013.01) | |
| *H04L 29/08* | (2006.01) | |
| *H04L 9/32* | (2006.01) | |
| *H04W 4/00* | (2009.01) | |
| *H04W 12/08* | (2009.01) | |
| *H04W 28/08* | (2009.01) | |
| *H04L 12/803* | (2013.01) | |
| *H04W 12/06* | (2009.01) | |
| *H04W 16/06* | (2009.01) | |
| *H04W 4/08* | (2009.01) | |

(52) U.S. Cl.
CPC ............. *G06F 21/30* (2013.01); *G06F 21/31* (2013.01); *G06F 21/45* (2013.01); *H04L 9/3268* (2013.01); *H04L 41/20* (2013.01); *H04L 41/28* (2013.01); *H04L 47/125* (2013.01); *H04L 63/08* (2013.01); *H04L 63/083* (2013.01); *H04L 63/0876* (2013.01); *H04L 63/10* (2013.01); *H04L 63/101* (2013.01); *H04L 63/102* (2013.01); *H04L 63/104* (2013.01); *H04L 63/105* (2013.01); *H04L 63/20* (2013.01); *H04L 63/205* (2013.01); *H04L 67/02* (2013.01); *H04L 67/10* (2013.01); *H04L 67/26* (2013.01); *H04L 67/306* (2013.01); *H04W 4/001* (2013.01); *H04W 4/003* (2013.01); *H04W 12/06* (2013.01); *H04W 12/08* (2013.01); *H04W 16/06* (2013.01); *H04W 28/08* (2013.01); *G06F 9/4445* (2013.01); *H04L 41/082* (2013.01); *H04L 41/5096* (2013.01); *H04W 4/08* (2013.01)

(58) Field of Classification Search
CPC ... H04L 63/083; H04L 63/102; H04L 63/205; H04L 67/02; H04L 67/306; H04L 63/101; H04L 9/3268; H04L 63/0876; H04L 41/20; H04L 41/02; G06F 8/60; G06F 8/71; G06F 9/4445; H04W 12/06; H04W 4/003
USPC .......................................................... 726/1
See application file for complete search history.

(56) References Cited

U.S. PATENT DOCUMENTS

| | | | |
|---|---|---|---|
| 7,707,643 | B2 | 4/2010 | DeMello et al. |
| 7,711,796 | B2 | 5/2010 | Gutt et al. |
| 7,746,851 | B2 | 6/2010 | Chandrasiri et al. |
| 7,886,033 | B2 | 2/2011 | Hopmann et al. |
| 7,925,729 | B2 | 4/2011 | Bush et al. |
| 8,086,233 | B2 | 12/2011 | Millet et al. |
| 8,281,010 | B2 | 10/2012 | Ansari et al. |
| 8,359,016 | B2 | 1/2013 | Lindeman et al. |
| 8,548,452 | B2 | 10/2013 | Coskun et al. |
| 8,572,676 | B2 | 10/2013 | Sapp et al. |
| 8,583,683 | B2 | 11/2013 | Rathod |
| 8,595,186 | B1 | 11/2013 | Mandyam et al. |
| 8,688,147 | B2 | 4/2014 | Nguyen et al. |
| 8,769,270 | B2 | 7/2014 | Orsini et al. |
| 8,812,685 | B2 | 8/2014 | Fuller |
| 8,856,289 | B2 | 10/2014 | Ansari et al. |
| 8,935,275 | B2 | 1/2015 | Rathod |
| 9,106,661 | B1 | 8/2015 | Stamos |
| 9,210,183 | B2 | 12/2015 | Sadovsky et al. |
| 9,535,675 | B2 | 1/2017 | Mohamad Abdul et al. |
| 2004/0054676 | A1 | 3/2004 | McNally et al. |
| 2005/0125509 | A1 | 6/2005 | Ramachandran |
| 2006/0048142 | A1 | 3/2006 | Roese et al. |
| 2007/0055752 | A1* | 3/2007 | Wiegand ................. H04L 67/14 709/220 |
| 2007/0093243 | A1 | 4/2007 | Kapadekar et al. |
| 2007/0243862 | A1 | 10/2007 | Coskun et al. |
| 2008/0168072 | A1 | 7/2008 | Freedman |
| 2009/0254392 | A1 | 10/2009 | Zander |
| 2009/0265701 | A1 | 10/2009 | Naslavsky et al. |
| 2009/0300742 | A1 | 12/2009 | Ahn |
| 2010/0114618 | A1 | 5/2010 | Wilcock et al. |
| 2011/0282836 | A1 | 11/2011 | Erickson et al. |
| 2012/0084184 | A1 | 4/2012 | Raleigh et al. |
| 2012/0106399 | A1 | 5/2012 | Abendroth et al. |
| 2012/0131327 | A1 | 5/2012 | Tomlinson |
| 2012/0179802 | A1 | 7/2012 | Narasimhan et al. |
| 2012/0278454 | A1 | 11/2012 | Stewart et al. |
| 2012/0297444 | A1* | 11/2012 | Kacherov ............... H04L 63/20 726/1 |
| 2013/0219307 | A1 | 8/2013 | Raber et al. |
| 2013/0247028 | A1 | 9/2013 | Brooks et al. |
| 2013/0254834 | A1 | 9/2013 | King |
| 2013/0262626 | A1 | 10/2013 | Bozek et al. |
| 2014/0006347 | A1 | 1/2014 | Qureshi et al. |
| 2014/0007084 | A1 | 1/2014 | Ding |
| 2014/0007182 | A1 | 1/2014 | Qureshi et al. |
| 2014/0007183 | A1* | 1/2014 | Qureshi .................. G06F 21/10 726/1 |
| 2014/0007214 | A1 | 1/2014 | Qureshi et al. |
| 2014/0032759 | A1 | 1/2014 | Barton et al. |
| 2014/0040975 | A1 | 2/2014 | Raleigh et al. |
| 2014/0068030 | A1 | 3/2014 | Chambers et al. |
| 2014/0108801 | A1 | 4/2014 | McBride et al. |
| 2014/0113593 | A1 | 4/2014 | Zhou et al. |
| 2014/0162614 | A1 | 6/2014 | Lindeman et al. |
| 2014/0172799 | A1 | 6/2014 | Dorman |
| 2014/0199962 | A1 | 7/2014 | Mohammed et al. |
| 2014/0259178 | A1 | 9/2014 | Karaa et al. |
| 2014/0280815 | A1 | 9/2014 | Candelaria et al. |
| 2014/0337528 | A1 | 11/2014 | Barton et al. |
| 2015/0009533 | A1 | 1/2015 | Anno et al. |
| 2015/0070585 | A1 | 3/2015 | Sharif-Ahmadi et al. |
| 2015/0156122 | A1 | 6/2015 | Singh et al. |
| 2015/0249684 | A1 | 9/2015 | Zhang et al. |
| 2015/0278245 | A1 | 10/2015 | Sagar et al. |
| 2015/0281087 | A1 | 10/2015 | Jalan et al. |
| 2015/0302338 | A1 | 10/2015 | Zaveri |
| 2015/0304891 | A1 | 10/2015 | Dinan |
| 2016/0085533 | A1 | 3/2016 | Jayanti Venkata et al. |
| 2016/0087854 | A1 | 3/2016 | Jayanti Venkata et al. |
| 2016/0087955 | A1 | 3/2016 | Mohamad Abdul et al. |
| 2016/0087956 | A1 | 3/2016 | Maheshwari et al. |
| 2016/0088026 | A1 | 3/2016 | Mohamad Abdul et al. |

FOREIGN PATENT DOCUMENTS

| | | |
|---|---|---|
| EP | 2 716 086 A1 | 4/2014 |
| EP | 2 759 154 A1 | 7/2014 |
| EP | 2757471 | 7/2014 |
| WO | 2008/016580 A1 | 2/2008 |
| WO | 2011123328 | 10/2011 |
| WO | 2012/109751 A1 | 8/2012 |
| WO | 2012/164287 A1 | 12/2012 |
| WO | 2013/041849 A1 | 3/2013 |
| WO | 2014/036296 A1 | 3/2014 |
| WO | 2014/047168 A1 | 3/2014 |
| WO | 2016048414 | 3/2016 |
| WO | 2016048415 | 3/2016 |
| WO | 2016048416 | 3/2016 |
| WO | 2016048417 | 3/2016 |

OTHER PUBLICATIONS

International Application No. PCT/US2015/026697, International Preliminary Report on Patentability mailed on Sep. 2, 2016, 10 pages.

(56) References Cited

OTHER PUBLICATIONS

U.S. Appl. No. 14/689,733, Notice of Allowance mailed on Aug. 29, 2016, 5 pages.
U.S. Appl. No. 14/690,034, Final Office Action mailed on Sep. 16, 2016, 12 pages.
StackOverflow-iphone plist, available online at http://stackoverflow.com/guestions/1756636/what-is-the-use-of-plist, 2009, 2 pages.
Firtman, Programming the Mobile Web, Publisher: O'Reilly Media, 2010, 4 pages.
International Application No. PCT/US2015/026596, International Preliminary Report on Patentability mailed on Nov. 22, 2016, 11 pages.
International Application No. PCT/US2015/026699, International Preliminary Report on Patentability mailed on Nov. 10, 2016, 9 pages.
U.S. Appl. No. 14/689,722, Final Office Action mailed on Dec. 15, 2016, 25 pages.
U.S. Appl. No. 14/689,733, Supplemental Notice of Allowance mailed on Dec. 1, 2016, 2 pages.
U.S. Appl. No. 14/689,983, Non-Final Office Action mailed on Dec. 9, 2016, 5 pages.
U.S. Appl. No. 14/690,062, Non-Final Office Action mailed on Nov. 10, 2016, 5 pages.
U.S. Appl. No. 14/690,034, Notice of Allowance mailed on Jan. 5, 2017, 7 pages.
Chanliau, "Extending Enterprise Access and Governance with Oracle Mobile Security," Oracle Fusion Middleware, An Oracle White Paper, Mar. 2014, 29 pages.
"Can you pre-configure an app before deployment?" Enterprise iOS Forums, http://www.enterpriseios.com/forum/topic/Can_you_pre_configure_an_app_before_deployment, Jan. 25, 2013, 2 pages.
"Complete Mobility Management Solutions of Apple iOS," Apple iOS Device Management, http://www.air-watch.com/solutions/apple-ios/, retrieved Mar. 23, 2015, 5 pages.
"Complete Mobility Management Solutions for Samsung SAFE and KNOX Devices," Samsung for Enterprise (SAFE) Management, http://www.air-watch.com/solutions/android/samsung-for-enterprise/ retrieved Mar. 23, 2015, 4 pages.
"Comprehensive App, Security, Management and Deployment," AirWatch Mobile Application Management, http://www.air-watch.com/solutions/mobile-application-management/, retrieved Mar. 23, 2015, 6 pages.
"Comprehensive Security, Management and User Enablement for Android," AirWatch for Android Devices, http://www.air-watch.com/solutions/android/, retrieved Mar. 23, 2015, 3 pages.
"Configure and enforce policies across compatible IronKey secure USB mobile storage devices," Access Management Software, http://www.ironkey.com/en-us/access/enterprise/, © 2015 Imation Corp., retrieved Mar. 23, 2015, 3 pages.
"Flexible Containerization for Your Mobile Deployment," AirWatch Workspace Management, http://www.air-watch.com/solutions/containerization/, retrieved Mar. 24, 2015, 2 pages.
"Manage Mobile Devices with Configuration Manager and Microsoft Intune," https://technet.microsoft.com/en-us/library/jj884158.aspx, updated Mar. 3, 2015, 5 pages.
"Mobile Device Management for iOS, Android & Windows," Mobile Device Management (MDM), https://www.manageengine.com/products/desktop-central/mobile-device-management-mdm.html, retrieved Mar. 25, 2015, 4 pages.
International Application No. PCT/US2015/026594, International Search Report and Written Opinion mailed on Aug. 10, 2015, 15 pages.
International Application No. PCT/US2015/026596, International Search Report and Written Opinion mailed on Aug. 14, 2015, 13 pages.
International Application No. PCT/US2015/026697, International Search Report and Written opinion mailed on Jul. 24, 2015, 11 pages.
International Application No. PCT/US2015/026697, Written Opinion mailed on Apr. 4, 2016, 8 pages.
International Application No. PCT/US2015/026699, International Search Report and Written Opinion mailed on Aug. 6, 2015, 11 pages.
U.S. Appl. No. 14/689,722, Non-Final Office Action mailed on Jun. 7, 2016, 20 pages.
U.S. Appl. No. 14/689,733, Non-Final Office Action mailed on Jun. 2, 2016, 6 pages.
U.S. Appl. No. 14/690,034, Non-Final Office Action mailed on May 19, 2016, 15 pages.
U.S. Appl. No. 14/690,062, Notice of Allowance mailed on Feb. 23, 2017, 8 pages.
U.S. Appl. No. 15/347,152, Non-Final Office Action mailed on Feb. 27, 2017, 7 pages.
U.S. Appl. No. 14/689,722, "Notice of Allowance", dated May 5, 2017, 20 pages.
U.S. Appl. No. 14/689,983, "Notice of Allowance", dated May 30, 2017, 5 pages.

* cited by examiner

| Non-Compliance(s) 712 | User Role(s) 714 | Remedial Action(s) 716 | Time Period 718 |
|---|---|---|---|
| - Non-conforming password<br>- Installation of Unauthorized Application | Executive, Employee | - Remove Application | 24 hours |
| - Inactivity of Endpoint Device | Employee, Manager | - Request Response and authentication | 48 hours |
| - Device enrollment criteria violation | Employee, Contractor | - Lock the device / Workspace / Container | 2 hours |
| - Altering Hardware / Software Configuration<br>- Endpoint device lost / stolen | All User Roles | - Wipe Device<br>- Unregister Device | No Time Period |

FIG. 7

| Non-Compliance Levels 812 | Non-Compliance(s) 814 | User Role(s) 816 | Resource(s) Not Permitted for Access 818 | Time Period 820 |
|---|---|---|---|---|
| Low | - Non-conforming password<br>- Installation of Unauthorized Application | Executive, Employee | HR Application | 24 hours |
| Medium | - Inactivity of Endpoint Device | Employee, Manager | HR Application | 48 hours |
| High | - Device enrollment criteria violation | Employee, Contractor | Corporate Intranet Web Services | 2 hours |
| Fully Non-Compliant | - Altering Hardware / Software Configuration<br>- Endpoint device lost / stolen | All User Roles | All Resources | No Time Period |

FIG. 8

POLICY BASED COMPLIANCE MANAGEMENT AND REMEDIATION OF DEVICES IN AN ENTERPRISE SYSTEM

CROSS-REFERENCES TO RELATED APPLICATIONS

The present application claims the benefit and priority of U.S. Provisional Application No. 62/054,544, filed Sep. 24, 2014, entitled "Mobile Security Manager (MSM)," the entire contents of which is incorporated herein by reference for all purposes.

BACKGROUND

The present disclosure relates generally to managing compliance of remote devices that access an enterprise system. More particularly, techniques are disclosed for using a compliance policy to manage remediation of non-compliance uses of remote devices to access an enterprise system.

With the proliferation of devices including mobile devices, many enterprises are adopting a "bring your own device" (BYOD) policy. BYOD enables users to bring their own devices to connect to an enterprise's system to access resources (e.g., applications or data) provided by the enterprise. A BYOD policy may permit users to continue use of their own devices for personal use. Managing different uses (e.g., personal use and corporate use) of user-owned devices in an enterprise system becomes a paramount concern for an enterprise. Permitting user-owned devices to access an enterprise system can present new security risks. Once access to an enterprise system is obtained by a user-owned device, the enterprise system may be exposed to security risks from non-compliant devices and non-compliant use of devices. Enterprise systems may be challenged to find ways to separate personal data from enterprise data on user-owned devices. User-owned devices may contain personal information and have special privacy considerations. Many user-owned devices may lack enterprise security controls to enable integration of those devices into an enterprise system. Security becomes an even greater concern when user-owned devices are compromised (e.g., hacked, stolen, or lost). Enterprises are searching for new and improved ways to integrate user-owned devices with the enterprise identity governance and access control infrastructure for security and compliance reasons.

To facilitate management of user-owned devices and corporate devices that access an enterprise system, some enterprises may implement a mobile device management (MDM) system and/or a mobile application management (MAM) system. Such systems may facilitate management and control of access to an enterprise system to ensure an enterprise system and its resources are secured. Management and control of access to an enterprise system may include communicating information about compliance and resources, and actions that must be taken for maintaining access to the enterprise system.

An enterprise that has thousands of users (e.g., employees, contractors, and customers), may be faced with the task of managing access and compliance for thousands of devices that access the enterprise. Users may operate different devices for different roles for accessing an enterprise system. Many users may be burdened with managing compliance for an enterprise system, which often times may be complex. An enterprise system may have many different compliance rules, which can vary based on a variety of factors including a user roles and device types. In some instances, the compliance rules may conflict when a user is associated with multiple roles, such that the user in unable to clearly determine the applicable compliance policies. For users that operate multiple devices, these users may be unable to keep track of compliance on each of their devices. Enterprises may have a difficult time to get users to comply with compliance policies. To further complicate matters, users may operate devices differently with respect to personal use, such that enterprises are challenged with ways to ensure that each device associated with a user is compliant.

As a result of the complexities of managing compliance on devices that access an enterprise system, enterprises are unable to routinely manage compliance on devices. To ensure that access to an enterprise system is not compromised, an enterprise may completely restrict access to an enterprise system regardless of a severity of non-compliance and a user's role. Some devices may need to be manually inspected for compliance and remediation. Devices may not be equipped to automatically implement remediation for compliance related to accessing an enterprise system. Enterprises are searching for ways to manage compliance and remediation of devices that access an enterprise system.

BRIEF SUMMARY

The present disclosure relates generally to managing compliance of remote devices that access an enterprise system. More particularly, techniques are disclosed for using a compliance policy to manage remediation of non-compliances of remote devices that access an enterprise system. A device access management system may be implemented to automate remediation of non-compliances of remote devices accessing an enterprise system.

The device access management system may manage compliance of remote devices using a compliance policy. A compliance policy may indicate one or more non-compliances for accessing an enterprise system using a remote device. A non-compliance may be defined by a compliance rule. Examples of non-compliance may include, without limitation, altering hardware or software of a remote device, installing an unauthorized application on a remote device, or inactivity of use of a remote device for a time period. A compliance rule may be further defined based on one or more user roles for accessing the enterprise system. The compliance policy may indicate one or more remedial actions that can be performed to remedy non-compliances.

In some embodiments, a compliance policy may indicate a time period ("grace period") for performing remedial actions. Before the grace period expires, a message may be sent to a user and/or a remote device associated with the user to indicate the non-compliance and one or more remedial actions that can be performed for the non-compliance. For example, an email message may be sent to a user to indicate the non-compliance and the remedial action(s) for the non-compliance. The notification may include an instruction that causes the remote device to perform the remedial action. When the grace period expires, the device management system may send a message to perform one or more remedial actions. The remedial actions performed after the grace period expires may be different from those performed before the grace period expires. For example, the device access management system may send a message that automatically causes the remote device to perform a remedial action (e.g., wipe memory on device or lock device) to deny access to a resource or an enterprise system entirely. The device access management system may automatically perform a remedial action that denies access to the enterprise system or one of the resources provided by the enterprise system. By sending a message that causes a remedial action to be performed on a remote device, a device access management system can ensure that the remote device is compliant. In an enterprise system having thousands of remote devices, the ability to automatically remedy each remote device may reduce the burden on users and the enterprise to manage compliance of each individual registered remote device.

In some embodiments, the device access management system may control remediation based on different levels of non-compliance. Each level of non-compliance may be defined by a rule. The rule may indicate one or more non-compliances for the level. Non-compliance may be assessed based on whether the non-compliance for a level is detected. In some embodiments, a level may be defined in part based on a user role, such that a remote device is non-compliant when the user role associated with a user of the remote device matches the role defined for the level. Access to resources of an enterprise system may be controlled based on the different levels of compliance. Access may be inhibited for those resources not permitted during a time period of a non-compliance. By defining levels of non-compliance, an enterprise system can control access to its resources in a fine-grain manner rather than preventing access to all resources in the enterprise system. Levels of non-compliance further enable an enterprise to control remediation of remote devices based on the security risk posed to the enterprise by different non-compliances.

Some embodiments of the present invention may be implemented by a computing system. The computing system may be implemented as part of a device access management system. The computing system may implement methods and operations. In at least one embodiment, the computing system may include one or more processors and a memory storing instructions that, when executed by the one or more processors, cause the one or more processors to implement operations. The operations may be implemented to perform a method. In some embodiments, a non-transitory computer-readable medium may comprise instructions, that when executed by one or more processors, causes operations to be performed. In some embodiments, a non-transitory computer-readable medium may protect a computer from an electronic communication containing malicious code. In one example, instructions stored on a computer-readable medium, when executed by one or more processors, may cause the methods and operations described below to be implemented. Yet other embodiments relate to systems and machine-readable tangible storage media which employ or store instructions for the methods and the operations described below.

In at least one embodiment, a method may be implemented by the computer system. The method may include identifying a compliance policy for using a remote device with an enterprise computer system. The remote device may be registered to access the enterprise computer system. The method may include detecting, based on the compliance policy, a non-compliance of the remote device. The method may include assessing, by a computer system, based on the compliance policy, a level of non-compliance of the remote device. The method may include establishing, based on the compliance policy and the level of non-compliance, a time period for remediation of the non-compliance. The method may include receiving a request to access a computing resource in the enterprise computer system. The method may include providing access to the computing resource based on the level of non-compliance. The method may include inhibiting access to the computing resource in the enterprise computer system based on the level of non-compliance and based on determining that the time period has expired. In some embodiments, access to the computing resource may be provided based on determining that the level of non-compliance satisfies a compliance threshold. Access to the computing resource may be inhibited based on determining that the level of non-compliance does not satisfy a compliance threshold. The method may include instructing the remote device to perform an action to remedy the non-compliance based on determining that the time period has expired.

In some embodiments, an action to remedy a non-compliance may include preventing access to use of the remote device with the enterprise computer system or altering registration of the remote device to access the enterprise computer system.

In some embodiments, the compliance policy may indicate the action to remedy the non-compliance and may indicate a time period for performing the action. The compliance policy may indicate a condition for the non-compliance. The condition may be based on a first user role. The compliance policy may identify the time period for remediation of the non-compliance and the action for remedying the non-compliance based on determining that the condition is satisfied. The method may further include: identifying a user role associated with an identity of a user of the remote device, the user role enabling the identity to access the enterprise computer system; and determining that the condition is satisfied based on the user role matching the first user role. The method may further include: determining one or more device attributes of the remote device and a geo-location of the remote device, where the condition is further based on a remote device attribute and a remote device geolocation; and determining that the condition is satisfied based on the remote device attribute matching a device attribute of the remote device and based on the geolocation of the remote device matching the remote device geolocation.

In some embodiments, a non-compliance of a remote device may include altering a hardware configuration of the remote device, installing a blacklisted application on the remote device, using the remote device in a manner that is non-compliant with a policy related to registration of the remote device to access the enterprise computer system, adjusting a security configuration of the remote device in a manner that is non-compliant with a security policy for accessing the enterprise computer system, or inactivity corresponding to use of the remote device, the inactivity exceeding a threshold time period.

In some embodiments, the method may include identifying a second compliance policy for using the remote device with the enterprise computer system. The compliance policy may be a first compliance policy that is different from the second compliance policy. The method may include detecting a second non-compliance of the remote device based on the second compliance policy. The method may include assessing, based on the second compliance policy, a second level of non-compliance of the remote device. The level of non-compliance may correspond to a first level of non-compliance. The time period may be established based on selecting a time period from one of the first compliance policy or the second compliance policy. The time period may be selected based on comparing the first level of non-compliance or the second level of non-compliance.

In at least one embodiment, another method may be implemented by the computer system. The method may include identifying a compliance policy for using a remote device with an enterprise computer system. The remote device may be registered to access the enterprise computer system. The method may include detecting a non-compliance of the remote device based on the compliance policy. The method may include categorizing the non-compliance into a level of non-compliance based on the compliance policy and establishing a time period for remediation of the non-compliance. The method may include allowing access to a first computing resource in the enterprise computer system despite the level of non-compliance. The method may include inhibiting access to a second computing resource in the enterprise computer system based on the level of non-compliance. The method may include determining that the time period has passed. The method may include inhibiting access to the first computing resource in the enterprise computer system based on the level of non-compliance and based on determining that the time period has passed. The method may include transmitting a message to the remote device based on determining that the time period has passed. The message may instruct the remote device to automatically remedy the non-compliance. The time period may be stored with the compliance policy and is established based on the level of non-compliance. The compliance policy may be a first compliance policy associated with a user role for accessing the enterprise computer system. The method may include identifying a second compliance policy for using the remote device to access the enterprise computer system. The method may include observing a second non-compliance of the remote device based on the second compliance policy. The method may include selecting the time period from the first compliance policy for implementation over a time period of the second compliance policy.

The foregoing, together with other features and embodiments will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 7 depicts an example a compliance policy indicating non-compliances and remedial actions for the non-compliances according to some embodiments of the present invention.

FIG. 8 depicts an example a compliance policy indicating levels of non-compliance and remedial actions corresponding to the levels according to some embodiments of the present invention.

DETAILED DESCRIPTION

Figure 1:
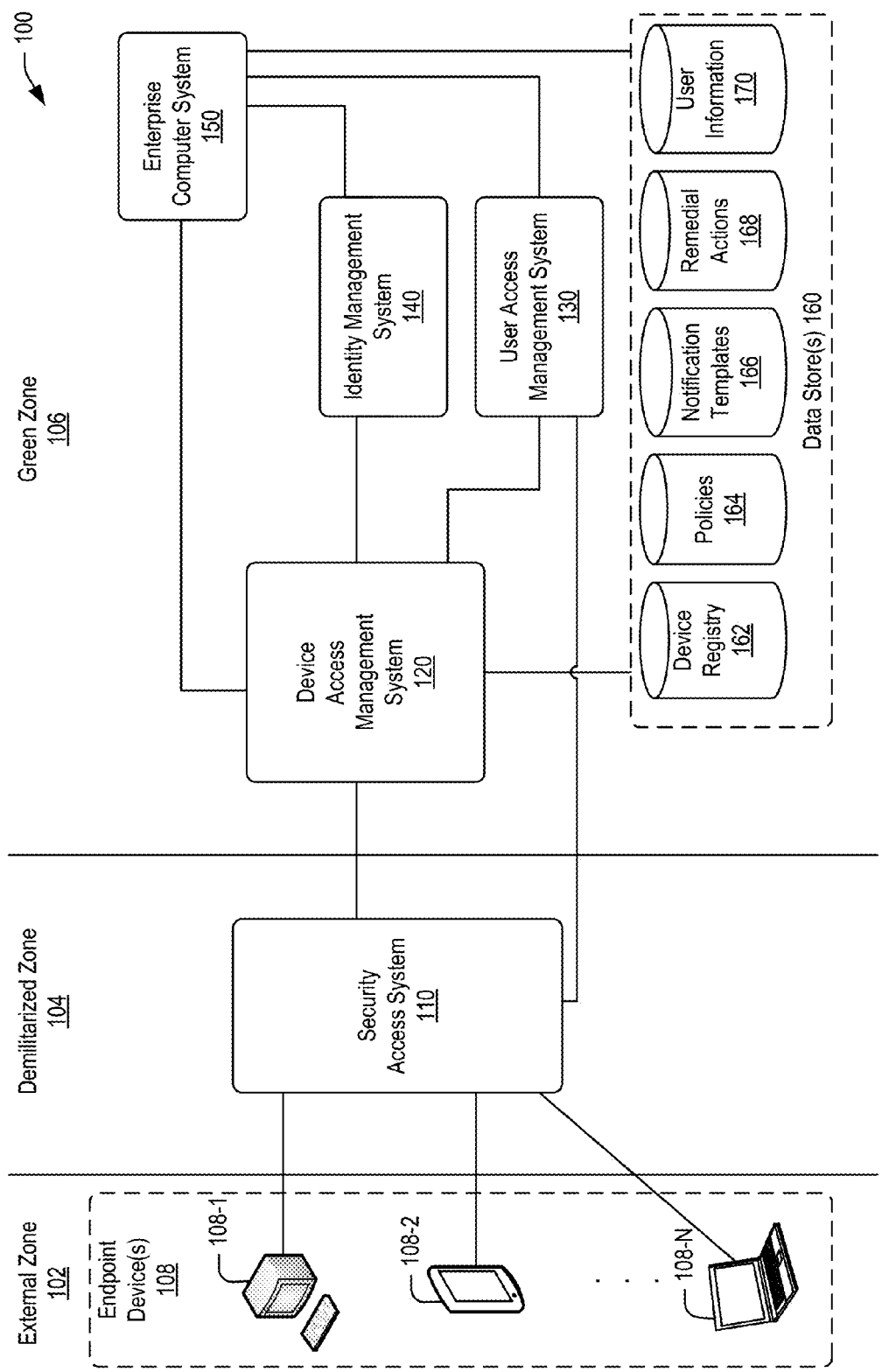
FIG. 1 depicts a simplified high level diagram of a computing system including a device access management subsystem for managing compliance of remote devices that access an enterprise system according to some embodiments of the present invention.

In the following description, for the purposes of explanation, specific details are set forth in order to provide a thorough understanding of embodiments of the invention. However, it will be apparent that various embodiments may be practiced without these specific details. For example, circuits, systems, algorithms, structures, techniques, networks, processes, and other components may be shown as components in block diagram form in order not to obscure the embodiments in unnecessary detail. The figures and description are not intended to be restrictive.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The present disclosure relates generally to managing compliance of remote devices that access an enterprise system. More particularly, techniques are disclosed for using a compliance policy to manage remediation of non-compliances of remote devices that access an enterprise system. A device access management system may be implemented to automate remediation of non-compliances of remote devices accessing an enterprise system.

The device access management system may manage compliance of remote devices using a compliance policy. A compliance policy may indicate one or more non-compliances for accessing an enterprise system using a remote device. A non-compliance may be defined by a compliance rule. Examples of non-compliance may include, without limitation, altering hardware or software of a remote device, installing an unauthorized application on a remote device, or inactivity of use of a remote device for a time period. A compliance rule may be further defined based on one or more user roles for accessing the enterprise system. The compliance policy may indicate one or more remedial actions that can be performed to remedy non-compliances.

In some embodiments, a compliance policy may indicate a time period ("grace period") for performing remedial actions. Before the grace period expires, a message may be sent to a remote device to indicate the non-compliance and one or more remedial actions that can be performed for the non-compliance. The notification may include an instruction that causes the remote device to perform the remedial action. When the grace period expires, the device management system may send a message to perform one or more remedial actions. The remedial actions performed after the grace period expires may be different from those performed before the grace period expires. For example, the device access management system may send a message that automatically causes the remote device to perform a remedial action (e.g., wipe memory on device or lock device) to deny access to a resource or an enterprise system entirely. The device access management system may automatically perform a remedial action that denies access to the enterprise system or one of the resources provided by the enterprise system. By sending a message that causes a remedial action to be performed on a remote device, a device access management system can ensure that the remote device is compliant. In an enterprise system having thousands of remote devices, the ability to automatically remedy each remote device may reduce the burden on users and the enterprise to manage compliance of each individual registered remote device.

FIG. 1 depicts a simplified high level diagram of a computing system 100 for managing compliance of remote devices that access an enterprise system according to some embodiments of the present invention. Embodiments depicted in FIG. 1 are merely examples and is not intended to unduly limit the claimed embodiments of the present invention. One of ordinary skill in the art would recognize many variations, alternatives, and modifications.

Computing system 100 may be part of an enterprise system implemented for an enterprise. Computing system 100 may include enterprise computer system 150, which provides access to one or more resources 152 provided by the enterprise system. Examples of resources 152 may include a hardware resource, a software resource (e.g., an application), a data resource, a service resource, a place, an object, etc.) provided by a computing system. Resources 152 may be provided be enterprise computer system 150 or hosted by a third party provider and provided to remote devices by enterprise computer system 150.

Users may access enterprise computing system 150 using one or more remote devices, such as remote devices 108-1, 108-2, . . . 108-N (collectively remote devices 108). Access to enterprise computer system 150 using remote devices 108 may be controlled and managed by device access management system 120. Each of remote devices 108 may include a secure container application. The secure container application may provide a secure execution environment for communicating with device access management system 120 to access enterprise computer system 150. Remote devices 108 may communicate with device access management system 120 to obtain access to resources 152 provided by enterprise computer system 150.

Device access management system 120 may manage authentication and enrollment of remote devices 108 for accessing enterprise computer system 150. In some embodiments, device access management system 120 can manage compliance of remote devices 108 that access enterprise computer system 150. Specifically, device access management system 120 may assess compliance of a remote device for accessing enterprise computer system 150. Assessing compliance may include determining whether a remote device is non-compliant and a level of non-compliance of the remote device. Remote devices may be notified about their non-compliance. In some embodiments, a user may be given a time period ("grace period") during which a non-compliance may be remediated. Upon expiration of the time period, device access management system 120 may automatically remediate a non-compliance of a remote device by sending an instruction to the remote device, where the instruction causes the remote device to perform a remedial action for the non-compliance.

Device access management system 120 may manage access by remotes devices 108 to resources 152 based on assessing compliance of each of remote devices 108. In some embodiments, access to resources 152 may be controlled with respect to each resource, such that access to each resource is determining individually. Based on a level of non-compliance, access to some of resources 152 may be permitted, while access to some of resources 152 may be denied. Denying access to resources may include inhibiting access to those resources. Access to resources 152 may be regulated differently when the grace period ends. For example, access to all resources 152 may be denied when the grace period expires. In some embodiments, access to enterprise computer system 150 may be further controlled based on the user role(s) associated with a user identity registered with a remote device.

Computing system 100 may be defined by multiple zones, each corresponding to a different communication zone. In some embodiments, remote devices 108 may be located in an external communication zone ("external zone") 102. Device access management system 120 and enterprise computer system 150 may be located in a green communication zone ("green zone") 106. Green zone 106 may include one or more secure networks (e.g., a corporate network). Green zone 106 may be located inside the firewalls of an enterprise computing environment. External zone 102 may be part of an external network (e.g., the Internet), which can be unsecure. For example, external zone 102 may be located outside the firewalls of green zone 106.

In some embodiments, remote devices 108 may communicate with computer systems in green zone 106 through a security access system 110 located in a demilitarized zone (DMZ) 104. An example of DMZ 104 may be a corporate DMZ. Security access system 110 may facilitate secure communication between remote devices 108 and device access management system 120. For example, security access system 110 may provide a secure communication connection (e.g., tunnel) between a secure container application on any of remote devices 108 and device access management system 120.

Security access system 110 may provide services to authenticate a user of a remote device. Security access system 110 may communicate with a user access management system 130 to obtain authorization for a user of a remote device. For example, security access system 110 may obtain authorization tokens from user access management system 130 to facilitate single sign-on (SSO) authentication to resources provided by enterprise computer system 150. In one example, security access system 110 may be included in Oracle Mobile Security Access Server, which is part of Oracle Mobile Security Suite provided by the Oracle® Corporation.

Remote devices 108 may be of various different types, including, but not limited to, endpoint devices, a wearable device (e.g., a smart watch), a consumer device (e.g., an appliance), personal computers, desktops, Internet of Things (IOT) devices, mobile or handheld devices such as a laptop, a mobile phone, a tablet, computer terminals, etc., and other types of devices. In some embodiments, a remote device may be an application hosted on a computing device (e.g., a mobile device, an IOT Gateway, or an IOT Edge device). In some embodiments, a remote device may be endpoint, such as a workspace, that is running on another device. A workspace may be a controlled environment to provide access to enterprise data and applications on a device running the workspace. For example, a secure container application may run on one or more of remote devices 108. Examples of remote devices may include, without limitation, devices (e.g., a corporate device) issued by an enterprise associated with enterprise computer system 150 or a user's personal device ("BYOD device") that is used to access enterprise computer system 150.

A remote device may store information about its identity, for example, a MAC (media access control) address, a unique device identifier (UDID), or other device identifier. A remote device may store metadata attributes about the remote device, including, a type of operating system on the remote device, a version of the operating system, a host identifier if the remote device is hosted on another device, a device type, an IMEI (International Mobile Equipment Identity) number, a model of the remote device, a service provider (e.g., a carrier) of the remote device, a device name, a device state, a compliance status, or other information about the remote device.

In some embodiments, a remote device may be configured to determine device information about the remote device. The device information may include a state of operation of the remote device. The state of operation may indicate any of the following: when applications were installed, executed, and/or uninstalled; whether hardware and/or software in the remote device has been altered; information about applications (e.g., a password for an application); activity or inactivity related to use of the remote device; or other information related to execution of the remote device. A remote device may be configured to communicate with device access management system 120. For example, a remote device may periodically synchronize ("device sync") with device access management system 120 to provide device access management system 120 with device information about the remote device. In some embodiments, device access management system 120 may determine information about a remote device based on information that is received or not received from a remote device.

In certain embodiments, a remote device may be configured to implement (e.g., execute and operate) one or more applications. For example, one or more of remote devices 108 may execute a secure container application that is designed to hold "containerized" applications, i.e., applications that have been securely linked to their specific container. Examples of applications may include, without limitation, a computer application, a client application, a proprietary client application, a workspace, a container, and the like. In some embodiments, an application implemented by a remote device may be accessible or operated via one or more network(s).

A remote device may include a computing device that can be implemented using hardware, firmware, software, or combinations thereof. A remote device may include memory and one or more processors. Memory may be coupled to the processor(s) and may include instructions stored thereon which, when executed by the processor(s), cause the processor(s) to implement one or more operations, methods, or processes disclosed herein. Memory may be implemented using any type of persistent storage device, such as computer-readable storage media.

In some embodiments, remote devices 108 may be communicatively coupled to device access management system 120 and enterprise computer system 150 via one or more communication networks of various types. Examples of communication networks include, without restriction, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Device access management system 120 may be implemented in a computer system, which may comprise one or more computers and/or servers which may be general purpose computers, specialized server computers (including, by way of example, PC servers, UNIX servers, mid-range servers, mainframe computers, rack-mounted servers, etc.), server farms, server clusters, distributed servers, or any other appropriate arrangement and/or combination thereof. For example, device access management system 120 may include servers. All or some of servers may be located in the same geographical location or different geographical locations. The computing devices that make up device access management system 120 may run any of operating systems or a variety of additional server applications and/or mid-tier applications, including HTTP servers, FTP servers, CGI servers, Java servers, database servers, and the like. Exemplary database servers include without limitation those commercially available from Oracle, Microsoft, and the like. Device access management system 120 may be implemented using hardware, firmware, software, or combinations thereof. In one example, device access management system 120 may be included in Oracle Mobile Security Manager, which is part of Oracle Mobile Security Suite provided by the Oracle® Corporation.

Device access management system 120 may include at least one memory, one or more processing units (or processor(s)), and storage. The processing unit(s) may be implemented as appropriate in hardware, computer-executable instructions, firmware, or combinations thereof. Computer-executable instruction or firmware implementations of the processing unit(s) may include computer-executable or machine-executable instructions written in any suitable programming language to perform the various operations, functions, methods, and/or processes described herein. The memory in device access management system 120 may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer-readable storage media. In some embodiments, computer-readable storage media may be configured to protecting a computer from an electronic communication containing malicious code. The computer-readable storage media may include instructions stored thereon, that when executed on a processor, perform the operations described herein.

Device access management system 120 may also include or be coupled to additional storage, which may be implemented using any type of persistent storage device, such as a memory storage device or other non-transitory computer-readable storage medium. In some embodiments, local storage may include or implement one or more databases (e.g., a document database, a relational database, or other type of database), one or more file stores, one or more file systems, or combinations thereof. For example, device access management system 120 may be coupled to or may include one or more data stores, e.g., data stores 160. The memory and the additional storage are all examples of computer-readable storage media. For example, computer-readable storage media may include volatile or non-volatile, removable or non-removable media implemented in any method or technology for storage of information such as computer-readable instructions, data structures, program modules, or other data.

In some embodiments, device access management system 120 can manage enrollment and authentication of remote devices 108 to access enterprise computer system 150. Remote devices 108 may be enrolled for user identities registered to access enterprise system 120. Just as a user identity is used to authenticate a user, a remote device may be registered with an identity that is used to authenticate the remote device. An identity may be provisioned to a remote device and may be used to authenticate all further communications from that remote device. User information data store 170 in data stores 160 may include information about users registered to access enterprise computer system 150. The information may include user identity information about a user. Examples of user information are described with reference to FIG. 5.

Device access management system 120 may store information ("device record") about remote devices 108 in device registry 162 of data stores 160. The information may indicate a relationship between an identity of a user and an identity of each of one or more remote devices registered to access enterprise computer system 150 for that identity. Device access management system 120 may issue a certificate to a remote device for enrollment of that remote device with a user identity for accessing enterprise computer system 150. Device access management system 120 may allow a remote device to access enterprise computer system 150 if a request is from a user identity associated with an identity of the remote device. In some embodiments, access to enterprise computer system 150 and resources 152 may be controlled by managing compliance of the remote device. Examples of information stored for a remote device are described with reference to FIG. 5.

Device access management system 120 may be communicatively coupled to an identity management system 140. Identity management system 140 may manage the lifecycle of users of enterprise computer system 150 and their associated accounts provisioned for resources accessed from enterprise computer system 150. Identity management system 140 may manage roles (e.g., user groups) defined for accessing enterprise computer system 150. In some embodiments, identity management system 140 may implement manage policies for roles defined for accessing enterprise computer system 150. User information data store 170 may include information obtained about a user from identity management system 140. The information may include one or more user roles associated with an identity of a user. Examples of identity management system 140 may include Oracle Identity Manager provided by the Oracle® Corporation.

User access management system 130 may be communicatively coupled to device access management system 120. User access management system 130 may handle scope management, issuance of authorization tokens, issuance of refresh tokens, and issuance of access tokens. For example, user access management system 130 may process requests from security access system 110 for access by remote devices 108. In some embodiments, user access management system 130 may manage access policies for access to resources provided by enterprise computer system 150. Examples of user access management system 130 may include Oracle Access Manager provided by the Oracle® Corporation.

In some embodiments, device access management system 120 may manage settings of remote devices 108 that are enrolled to access enterprise computer system 150. Examples of settings may include, without limitation, device settings, installation settings, synchronization settings, communication settings, application settings, or other settings related to accessing an enterprise system. Information about settings may be stored in data stores 160. Some settings may correspond to information received from remote devices 108. Settings (e.g., device settings and installation settings) for some remote devices 108 may be verified for enrollment and checked for compliance by enrolled remote devices 108. In some embodiments, settings (e.g., synchronization settings) may be communicated to some remote devices 108 to enable the secure container application on remote devices 108 to configure synchronization of communication with device access management system 120 and enterprise computer system 150.

Access to enterprise computer system 150 using remote devices 108 can be managed using one or more policies. Policies may be stored in and accessed from policy store 164 in data stores 160. Examples of policies may include, without limitation, enrollment policies, compliance policies, workspace policies, and device policies. Policies may be defined by an administrator of enterprise computer system 150. Device access management system 120 may determine whether remote devices 108 are compliant with policies, which defining their access to enterprise computer system 150. Examples of compliance policies are described with reference to FIGS. 6-8. In some embodiments, device access management system 120 can perform remedial actions to adjust access for a remote device based on a policy. Device access management system 120 may communicate instructions to a remote device to instruct the remote device to take remedial action in response to compliance according to a policy. Notifications can be sent to remote devices 108 to inform them of compliance and/or non-compliance with a policy and a time period for compliance.

As explained above, device access management system 120 may use compliance policies to manage access to enterprise computer system 150 for remote devices 108 enrolled to access enterprise computer system 150. Information about compliance policies may be stored policies data store 164. In some embodiments, information about compliance policies may be received from enterprise computer system 150, identity management system 140, and/or user access management system 130. One or more compliance policies may be configured based on input received from an operator (e.g., an administrator) of device access management system 120.

Device access management system 120 can detect a non-compliance of a remote device using the identified compliance policy. Non-compliances may be defined in the compliance policy. Examples of non-compliances are described with reference to FIGS. 7 and 8. Device access management system 120 may determine device information about a remote device by synchronizing with the remote device to obtain the information. The device information may indicate information related to operation of the remote device. Device access management system may determine compliance based on the device information.

Device access management system 120 may assess the non-compliance(s) to determine a level of non-compliance. The level of non-compliance may be defined by the compliance policy used to determine the non-compliance(s). A time period for remediation may be established based on the level of non-compliance. A compliance policy may indicate the time period corresponding to the level of non-compliance.

Device access management system 120 may manage access to enterprise computer system 150 based on the compliance policy. In some embodiments, access to one or more of resources 152 may be permitted despite detecting non-compliance. Access to resources 152 may be assessed based on the compliance policy for a level of non-compliance. Device access management system 120 may deny access to some resources 152 based on the level of non-compliance. Denying access may include removing account access to a resource and/or preventing communication of a request for the resource to enterprise computer system 150.

In some embodiments, during a time period for remediation, device access management system 120 may send a remote device a notification about a non-compliance and one or more remedial actions. The notification may be sent to a remote device associated with a user or to a user associated with the remote device. A notification may be sent to a user as an electronic message that can be received using a remote device. The notification may include an instruction that causes the remote device to automatically perform a remedial action. Notifications may be sent based on a notification template configured for communicating non-compliances. Notification templates may be stored in notification templates data store 166 in data stores 160.

Upon expiration of a time period for remediation, device access management system 120 may perform one or more remedial actions. The remedial action performed after the expiration of the time period may be different from the remedial actions performed during the time period. After the expiration of the time period, a remedial action may include preventing access to enterprise computer system 150 entirely or preventing access to a resource. Other remedial actions may include instructing the remote device to automatically perform a remedial action (e.g., disable access from an application to enterprise computer system 150). A compliance policy may indicate one or more remedial actions for a detected non-compliance. Remedial actions may be defined in a remedial actions data store 168 in data stores 160. Examples of remedial actions are described with reference to FIGS. 7 and 8.

In an enterprise system having thousands of users, managing compliance of each remote device accessing the enterprise system may pose many challenges. Often times, compliance may vary with respect to many factors, including user roles, device types, and resources being accessed. Users may be burdened with having to manage each of their many remote devices for compliance. A device access management system can remotely control compliance by sending notifications to remote devices providing specific information about non-compliance to users and the remedial actions that can be performed to cure the non-compliances. Depending a type of non-compliance, a notification may instruct a remote device automatically perform a remedial action. Further, by causing remote devices to perform remedial actions, an enterprise can be assured that access to the enterprise by non-compliant remote devices is prevented.

Configuring compliance based on the roles of users may further enable an enterprise to control compliance in a manner that does not completely inhibit access to an enterprise system. Device access management system can adjust access to an enterprise by inhibiting access through remedial actions depending on the type of access sought for a role of a user. Access to an enterprise system may be further controlled in a fine-grain manner by defining access to resources based on a level of compliance. Controlling access to an enterprise system based on a level of compliance may enable an enterprise to dynamically control access based on consideration of the security risks posed to an enterprise by a non-compliant device. By defining different compliances rules based on the type of non-compliance, an enterprise can configure access to an enterprise system in a customized manner. Compliance rules defined based on roles and levels of compliance further enable an enterprise to define the severity of non-compliance and to effectively manage non-compliance without impacting access to groups of users.

Figure 2:
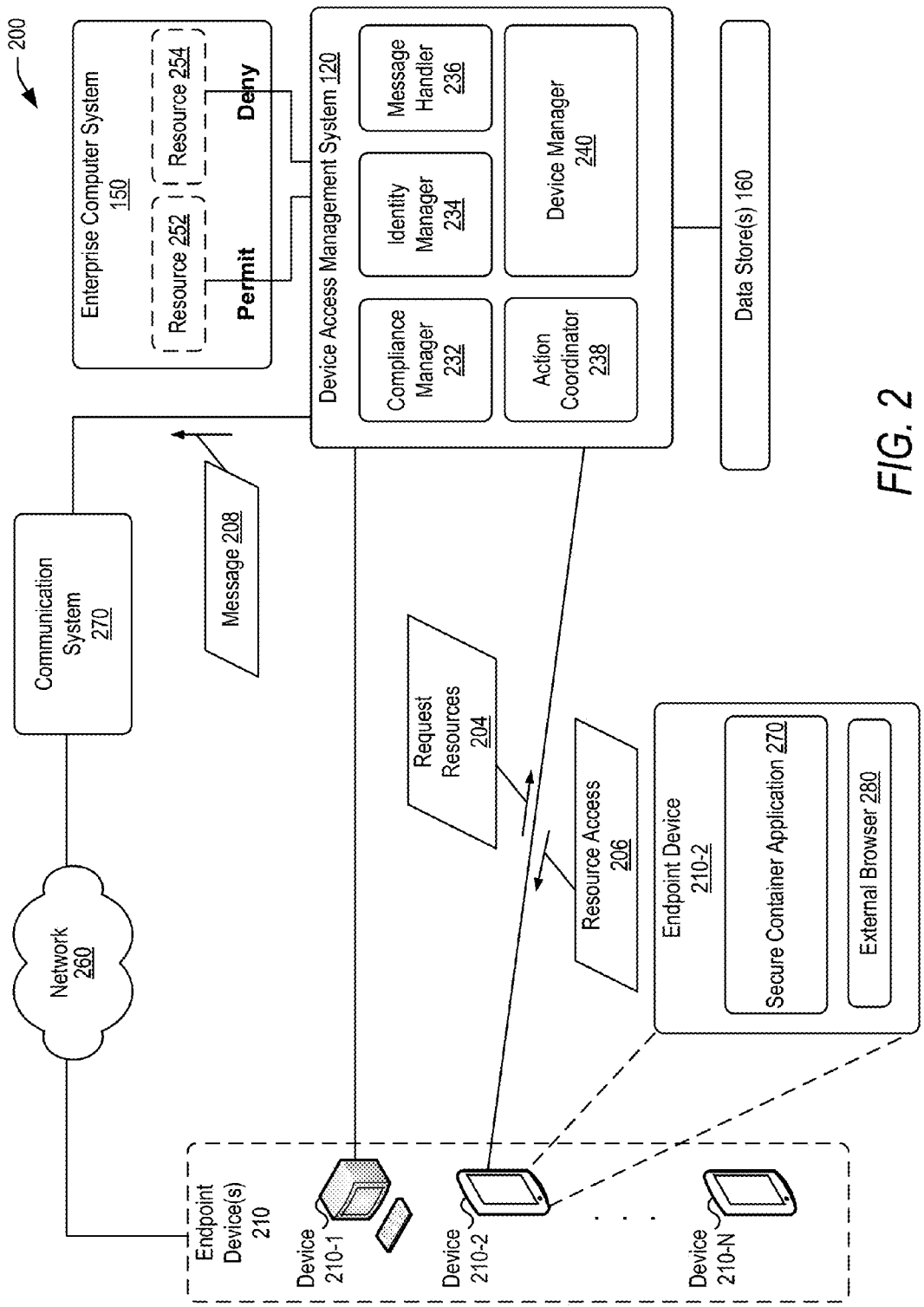
FIG. 2 shows a more detailed high level diagram of a device access management system according to some embodiments of the present invention.

Now turning to FIG. 2, a more detailed high level diagram of device access management system 120 is shown according to some embodiments of the present invention. As shown in FIG. 2, device access management system 120 may include several subsystems and/or modules including compliance manager 232, identity manager 234, message handler 238, and device manager 240. These subsystems and modules may be implemented in software (e.g., program code, instructions executable by a processor), in hardware, or combinations thereof. In some embodiments, the software may be stored in memory (e.g., a non-transitory computer-readable medium), on a memory device, or some other physical memory and may be executed by one or more processing units (e.g., one or more processors, one or more processor cores, one or more GPUs, etc.).

With the adoption of BYOD for enabling access to an enterprise system (e.g., enterprise computer system 150), many users may access the enterprise system using their remote devices. One or more remote devices, such as endpoint devices 210-1, . . . 210-N (collectively, endpoint devices 210), may be operated to access enterprise computer system 150. Although FIG. 2 depicts some remote devices that are used to access an enterprise system, the enterprise system may be accessed by thousands of users with thousands of device. Access to the enterprise system may be controlled through a computing system (e.g., computing system 100) including device access management system 120.

Each of endpoint devices 210 may include a secure container application that is configured to communicate with device access management system 120. Secure container application 270 may be distinct from other applications (e.g., external browser 280) executing on a remote device. For example, endpoint device 210-2 may include secure container application 270 executing on endpoint device 210-2. Secure container application 270 may be configured to communicate with device access management system 120. Endpoint device 210-2 may perform device synchronization communication ("device sync") to communicate device information about endpoint device 210-2 to device access management system 120. Endpoint device 210-2 may periodically synchronize with device access management system 120. In some embodiments, device access management system 120 may initiate device synchronization with one or more remote devices, e.g., endpoint devices 210.

In some embodiments, endpoint devices 210 may have access to information stored in data stores 160 to manage compliances based on remedial actions and/or instructions from device access management system 120. In some embodiments, secure container application 270 may be configured to execute one or more operations (e.g., execute a remedial action) based on an instruction from device access management system 120.

With thousands of remote devices accessing an enterprise system, compliance for remote devices accessing an enterprise system may be difficult to manage. Even more difficult is ensuring that remedial action is taken to cure non-compliance and to ensure that access is not permitted when remedial action is not taken. To overcome these and many other obstacles for managing compliance for thousands of remote devices, device access management system 120 may communicate notifications that automatically cause remedial actions to be taken by a remote device. Device access management system 120 may manage compliance using levels of compliance, which may be refined based on one or more criteria, such as user roles and access to resources.

Device manager 240 may manage access to enterprise computer system 150 for remote devices (e.g., endpoint devices 210). Specifically, device manager 240 may manage enrollment of remote devices to access enterprise computer system 150 based on one or more enrollment policies. Device manager 240 may handle communication with remote devices. Communication may include synchronization ("device synchronization") between a remote device and device access management system. Device synchronization may include communication of device information about a remote device from the remote device to device access management system 120. Device information may be stored in device registry 162. The device information may be used by device manager 240 to determine whether device is violating any enrollment policies.

Compliance manager 232 may manage compliance of endpoint devices 210 accessing enterprise computer system 150. Compliance manager 232 may identify a compliance policy for managing compliance for endpoint devices 210. Using device information obtained from a remote device, compliance manager 232 may determine whether the remote device is non-compliant for any of the non-compliances defined in a compliance policy. Compliance manager 232 may use device information to determine whether a remote device is non-compliant. Compliance manager 232 may assess non-compliance based on the non-compliances defined in a compliance policy.

A compliance policy may include one or more compliance rules. A non-compliance may be defined by a compliance rule, which indicates one or more criteria for the non-compliance. A compliance rule may define a non-compliance of a remote device based on one or more one or more actions related to use of a remote device. In some embodiments, a compliance rule may be defined based on criteria such as a user role, one or more remote device attributes, a geo-location of a remote device ("remote device geolocation"), and other contextual attributes. A compliance rule may be defined based one or more of the criteria described herein. In some embodiments, the applicability of a compliance policy may be based on one or more user roles. Examples of compliance rules are described with reference to FIGS. 6-8.

In some embodiments, a compliance rule may be defined using a conditional expression (e.g., a Boolean expression) of one or more of the criteria for a non-compliance. Compliance rules may be assessed to determine whether the condition(s) for a non-compliance defined by a compliance rule are satisfied. A non-compliance may be determined for the remote device when the remote device has been used in a manner defined by the non-compliance indicated by the compliance rule and when the other criteria, if any, defined for a compliance rule have been satisfied. For example, a condition for a compliance rule may be satisfied when a user role associated with an identity of a user registered for a remote device matches the role indicated by the compliance rule and when the remote device is operated in a manner corresponding to a non-compliance defined for the compliance rule. In another example, a compliance rule may be defined based on a non-compliance, a remote device geo-location, a remote device attribute (e.g., a type of remote device), and a user role. The compliance rule may be satisfied when all the criteria of a compliance rule have been satisfied as defined by the condition expression of the compliance rule. Information about a remote device may be determined to assess the criteria related to a remote device, such as a remote device geolocation and a remote device attribute.

Identity manager 234 may implement or may facilitate communication with an identity management system, e.g., identity management system 140. User information including role(s) associated with a user identity may be obtained from identity management system 140.

Compliance manager 232 may determine whether any time period exists for a non-compliant remote device and the remedial action(s) that can be performed before and after the expiration of the time period. In some embodiments, compliance manager 232 may assess a level of non-compliance for each of the non-compliances. As explained below, a level of non-compliance may be defined based on types of non-compliance, user roles, or combinations thereof. In some embodiments, one or more compliance rule may be defined for a level of non-compliance.

Compliance manager 232 may detect multiple non-compliances. The remedial actions and/or the time period for the remedial actions may vary based on the non-compliance. Compliance manager 232 may address each of the non-compliances individually. In some embodiments, compliance manager 232 may choose one of the remedies to address multiple non-compliances. A remedy may be chosen from each of the remedies for the non-compliances. One remedy may be chosen based on a rule defined in a compliance policy. For example, the least restrictive remedial action or the most restrictive remedial action may be chosen from the remedial actions. The time period for completing the remedial action may be chosen according to the chosen remedial action.

In some embodiments, multiple compliance policies may be applicable for managing access to enterprise computer system for a remote device. Each compliance policy may define different criteria for the same non-compliance or for different non-compliances. For example, two different compliance policies may be defined for the same non-compliance, but for different user roles. Compliance may be assessed based on each of the applicable compliance policies. When two different compliance policies define the same non-compliance, the least restrictive or the more restrictive compliance policy may be chosen. A compliance policy may be chosen based on the level of non-compliance detected based on each of the policies. The level of non-compliance determined for each compliance policy may be compared. For example, a more restrictive compliance policy may be chosen to ensure greater protection for access to enterprise computer system 150. In another example, a less restrictive compliance policy may be chosen to prevent a user from being denied access. A time period for remedying the non-compliance may be chosen based the compliance policy that is chosen. An enterprise can define rules for choosing a compliance policy when more than one compliance policy applies.

Action coordinator 238 may be configured to perform one or more remedial actions for a non-compliance. For example, action coordinator 238 may request a notification to be sent to endpoint device 210-2 about a non-compliance. The notification may include an instruction to cause endpoint device 210-2 to perform a remedial action. Action coordinator 238 may perform remedial actions based on assessing the time period for a non-compliance. Action coordinator 238 may utilize message handler 236 to send the notification to endpoint device 210-2.

In some embodiments, action coordinator 238 may manage access to one or more different resources, e.g., resource 252 and resource 254, provided by enterprise computer system 150. Action coordinator 238 may deny access to all or some resources. For example, device access management system 120 may receive a request 204 from endpoint device 210-2 for one or more resources, e.g., resource 252 and resource 254. Based on the non-compliance detected for endpoint device 210-2, action coordinator 238 may determine access to the requested resources. In some embodiments, access to resources may be defined based on a compliance policy.

Access may be further refined based on a level of non-compliance. In the example shown in FIG. 2, action coordinator 238 may permit access to resource 252 and may deny access to resource 254. For the permitted resource, action coordinator 238 may utilize message handler 236 to communicate information (e.g., resource access 206) for the permitted resource. Access to a resource may be denied by preventing further communication between endpoint device 210-2 and enterprise computer system 150 for the denied resource. Action coordinator 238 may inhibit access to the denied resource by preventing communication of request 204 to enterprise computer system 150. Preventing access to a resource may include sending a message to enterprise computer system 150 indicating that access is to be denied for the resource by a remote device associated with a user identity. In some embodiments, inhibiting access to a resource may include sending a notification to the remote device that is inhibited from accessing the resource. In some embodiments, inhibiting access to a resource may include initiating multi-factor authentication (e.g., step-up authentication) for accessing the resource. As such, a compliance level may be used to define access to a resource, such that a non-compliance of a remote device at the compliance level may initiate multi-factor authentication to determine access to the resource.

Message handler 236 may manage communication of messages (e.g., message 208) to remote devices, e.g., endpoint devices 210. Messages may include information about non-compliances, remedial actions, resources that are denied or permitted for access, and/or instructions that cause remedial actions to be performed by an endpoint device. Messages may be sent based on a notification template that defines how to send the messages, when to send the messages, and what information to include in the messages.

Messages may be communicated and received through communication system 250. Communication system 250 may provide services to send, receive, store, and/or access messages, where a "message" can include any electronic communication generated by a sender and directed to one or more recipients, such as email messages, instant messages (e.g., messages sent between users using various "chat" services), SMS/MMS messages (e.g., messages conforming to Short Messaging Service and/or Multimedia Messaging Service protocols supported by various cellular and other wireless data networks), voice messages, photo/image messages, social network messages, and so on. Examples of messaging services may include email services such as Gmail™ (a service of Google Inc.) and Yahoo!® Mail (a service of Yahoo! Inc.). Other examples may include instant messaging or chat services such as Gmail's chat feature or Facebook's chat (a service of Facebook, Inc.), SMS/MMS services provided by cellular data carriers, social network services with a messaging component (e.g., social networks provided by Facebook, Inc., or LinkedIn Corp.). Communication system 250 may provide web-based client interfaces, dedicated application programs, application program interfaces (APIs), and/or other tools for facilitating communication between device access management system 120 and endpoint devices 210.

Communication system 120 may communicate with endpoint devices via one or more communication networks (e.g., network 260) of various types. Examples of communication networks include, without restriction, the Internet, a WAN, a LAN, an Ethernet network, a public or private network, a wired network, a wireless network, and the like, and combinations thereof. Different communication protocols may be used to facilitate the communications including both wired and wireless protocols such as IEEE 802.XX suite of protocols, TCP/IP, IPX, SAN, AppleTalk, Bluetooth®, and other protocols.

Figure 3:
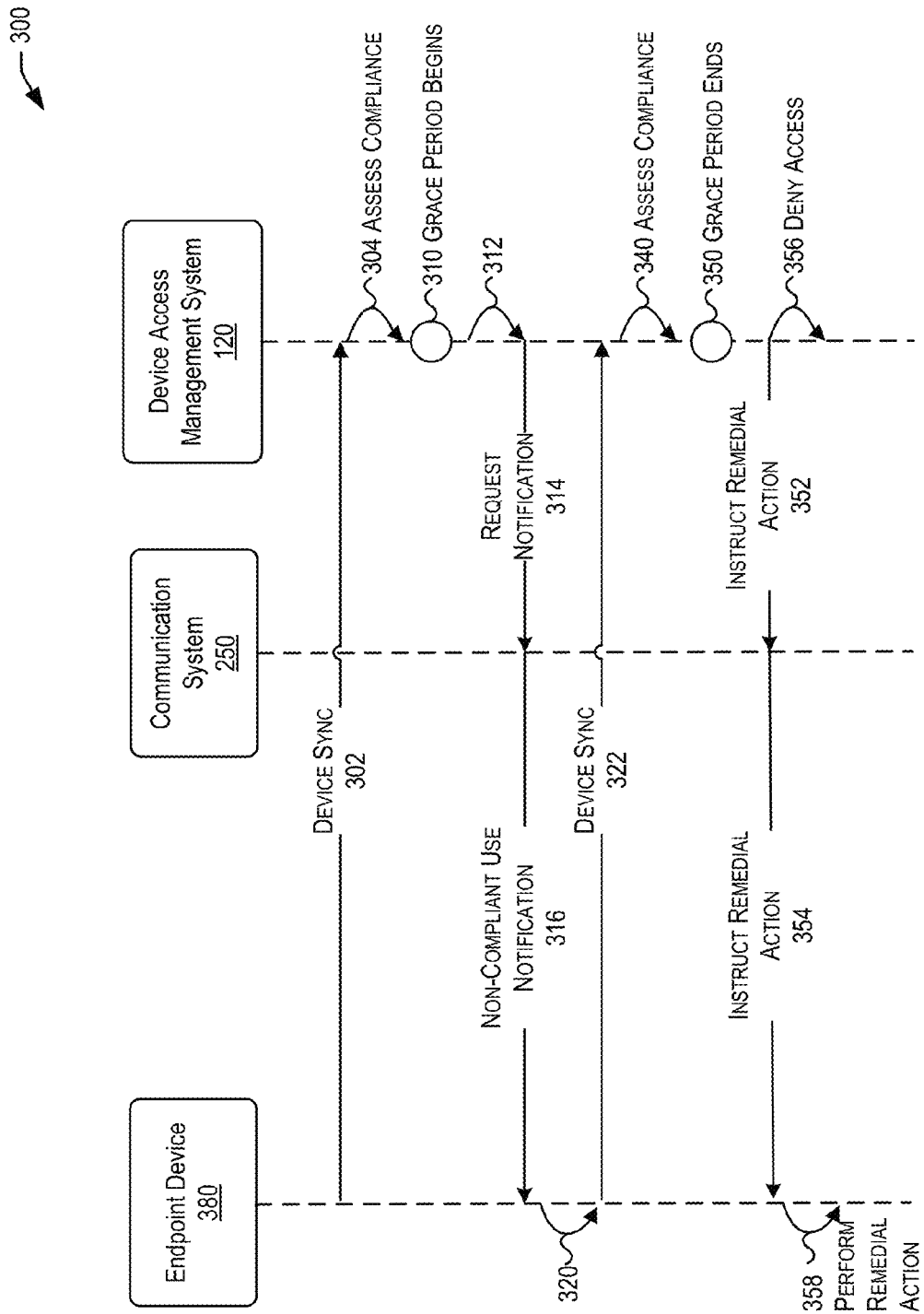
FIG. 3 illustrates a sequence of operations for managing compliance of remote devices that access an enterprise system according to some embodiments of the present invention.

FIG. 3 illustrates a sequence of operations 300 for managing compliance of remote devices that access an enterprise system according to some embodiments of the present invention. Specifically, the sequence of operations 300 illustrate an example of the operations performed for managing compliance for a remote device (e.g., endpoint device 380) during a remedial time period (e.g., a "grace period") and after the remedial time period expires. Endpoint device 380 may be one of a plurality of remote devices enrolled for access enterprise computer system 150. Compliance many be managed according to levels of non-compliance defined by a compliance policy. Examples of levels of non-compliance are described with reference to FIGS. 7 and 8.

A sequence of operations 300 may be initiated by device access management system 120 performing one or more operations 304. Device access management system 120 may assess compliance of endpoint device 380 for accessing enterprise computer system 150. Compliance may be assessed using information about endpoint device 380. For example, compliance may be assessed based on device information or other information related to use of endpoint device 380 used to access enterprise computer system 150.

In some embodiments, compliance of endpoint device 380 may be assessed based on information received from endpoint device 380. Device access management system 120 may receive device information about endpoint device 380 from endpoint device 380. Device information may be received as part of device synchronization between endpoint device 380 and device access management system 120. Device information may include attribute information about a remote device (e.g., platform version, geographical location, or phone type), such as information stored in a device record obtained during enrollment of the device. Device information may include an operation state of endpoint device 380 and any other information related to operation or use of endpoint device 380. For example, device information may indicate inactivity of endpoint device 380, passcode settings, applications installed, or operation state (e.g., jailbroken). In some embodiments, device access management system 120 may determine information about endpoint device 380 (e.g., whether endpoint device 380 is lost or stolen). Information about endpoint device 380 may be determined based on communication between endpoint device 380 and device access management system 120, such as when device synchronization does not occur. In some embodiments, multiple non-compliances can be identified when compliance is assessed. The non-compliances may be related or may correspond to different types of non-compliance.

Device access management system 120 may assess compliance of endpoint device 380 by determining whether endpoint device 380 has been used in a non-compliant manner. Compliance may be assessed based on a compliance policy for accessing an enterprise system. A compliance policy may define non-compliances of a remote device. Examples of non-compliances are described with reference to FIGS. 7 and 8. Non-compliances may include, for example, non-conforming password, installation of an unauthorized application, inactivity of use of a remote device, altering hardware or software on a remote device, or losing a remote device. In some embodiments, non-compliance may be determined based on one or more compliance rules indicated by the compliance policy. A non-compliance rule may be defined based one or more non-compliances. In some embodiments, a non-compliance rule may be defined for one or more user roles. Device access management 120 may determine a user role associated with an identity of a user registered for endpoint device 380.

Upon determining that endpoint device 380 has been used in a non-compliant manner, device access management system 120 may determine whether any remedial actions are defined for the non-compliances. Operations 304 may include determining any remedial actions for the non-compliance(s) and a grace period corresponding to each remedial action. Remedial actions may be defined for one or more non-compliances. For example, a compliance policy may indicate one or more remedial actions for remedying each non-compliance. Each non-compliance in the compliance policy may be associated with a grace period for remedial action. One or more remedial actions may be defined for a non-compliance.

In some embodiments, non-compliance may be remedied by performing the remedial action before the grace period expires. When the grace period expires, performing the remedial action may not remedy the non-compliance. After the grace period has expired, the non-compliance may be remedied by device access management system 120. Device access management system 120 may perform operations to automatically remedy the non-compliance. The operations may not include the remedial action. For example, the non-compliance may be remedied by preventing access to enterprise system altogether, whereas the remedial action was to cure the non-compliance.

At 310, device access management system 120 may determine that a grace period for non-compliance has begun. During the grace period, device access management system 120 may perform one or more operations 312 to manage remediation of the non-compliance. Device access management system 120 may periodically assess compliance to determine whether the non-compliance has been remedied. Device access management system 120 may also communicate with endpoint device 380. For example, device access management system 120 may receive communication (e.g., a device synchronization) from endpoint device 380. Endpoint device 380 may send device information about endpoint device 380 to device access management system 120.

As a part of assessing compliance, device access management system 120 may determine a level of non-compliance of the non-compliance. Examples of levels of non-compliance are described below with reference to FIGS. 7 and 8. The remedial action may be determined based on the level of compliance.

In some embodiments, operations 312 may include adjusting access to the enterprise system. Access to the enterprise system may be denied completely, or access to specific resources may be denied based on a variety of factors including, but not limited to, the non-compliance, a level of non-compliance, and a user role.

In some embodiments, during the grace period, a notification about the non-compliance may be transmitted for delivery to endpoint device 380. For example, device access management system 120 may request 314 communication system 250 to send a notification 316 to endpoint device 380. Notification 316 may indicate the non-compliance(s) and the grace period for remediation of the non-compliance(s). Notification 316 may include an instruction or a command for initiating a remedial action. In some embodiments, notification 316 may include an instruction that causes 320 endpoint device 380 to initiate the remedial action.

A notification may be sent based on a notification configuration associated with the compliance policy. An example of a notification configuration is described with reference to FIG. 6. In some embodiments, a remote device may be registered with information indicating a notification configuration for communication of non-compliances.

In the example shown in FIG. 3, device access management system 380 may receive communication (e.g., device sync 322) including device information from endpoint device 380. Device sync 322 may be received after notification 316 is sent to endpoint device 380.

Device access management system 120 may assess compliance 340 after device sync 322 occurs. Before determining that the grace period has expired, at 350, device access management system 120 may determine whether the non-compliance by endpoint device 380 is remedied. As described above, compliance may be assessed for endpoint device 380. Depending on the access to enterprise system that was denied based on the non-compliance, device access management system 120 may reinstate access to enterprise system based on determining that the non-compliance is remedied.

Device access management system 120 may determine whether the grace period has expired, at 350. Device access management system 120 may assess compliance of endpoint device 380 once the grace period has expired. In some embodiments, device access management system 120 may check a device record for endpoint device 380 to determine a compliance status of endpoint device 380. Upon determining that endpoint device 380 is not compliant, device access management system 120 may request 352 communication system 250 to transmit 354 a message including an instruction to cause a remedial action to be performed at endpoint device 380. Examples of remedial actions may include, without limitation, preventing access to use of endpoint device 380 with an enterprise system, clearing memory accessible endpoint device 380, or uninstalling an application (e.g., secure container application) configured to communicate with an enterprise system. Endpoint device 380 may perform a remedial action 358 in response to the message received from device access management system 120. Remedial action 358 may be performed by a user operating endpoint device 380 or may be performed by endpoint device 380 in response to the message received from device access management system 120.

In some embodiments, device access management system 120 may deny access 356 to endpoint device 380 when the grace period ends. Access may be denied based on determining that the remedial action could not be performed. Access may be denied with respect to specific resources based on a variety of factors including, but not limited to, a level of non-compliance and a user role, and the type of non-compliance. In some embodiments, access to an enterprise system may be inhibited entirely. For example, the remedial action may include requesting the enterprise system to alter registration of endpoint device 380 to access the enterprise system.

Figure 4:
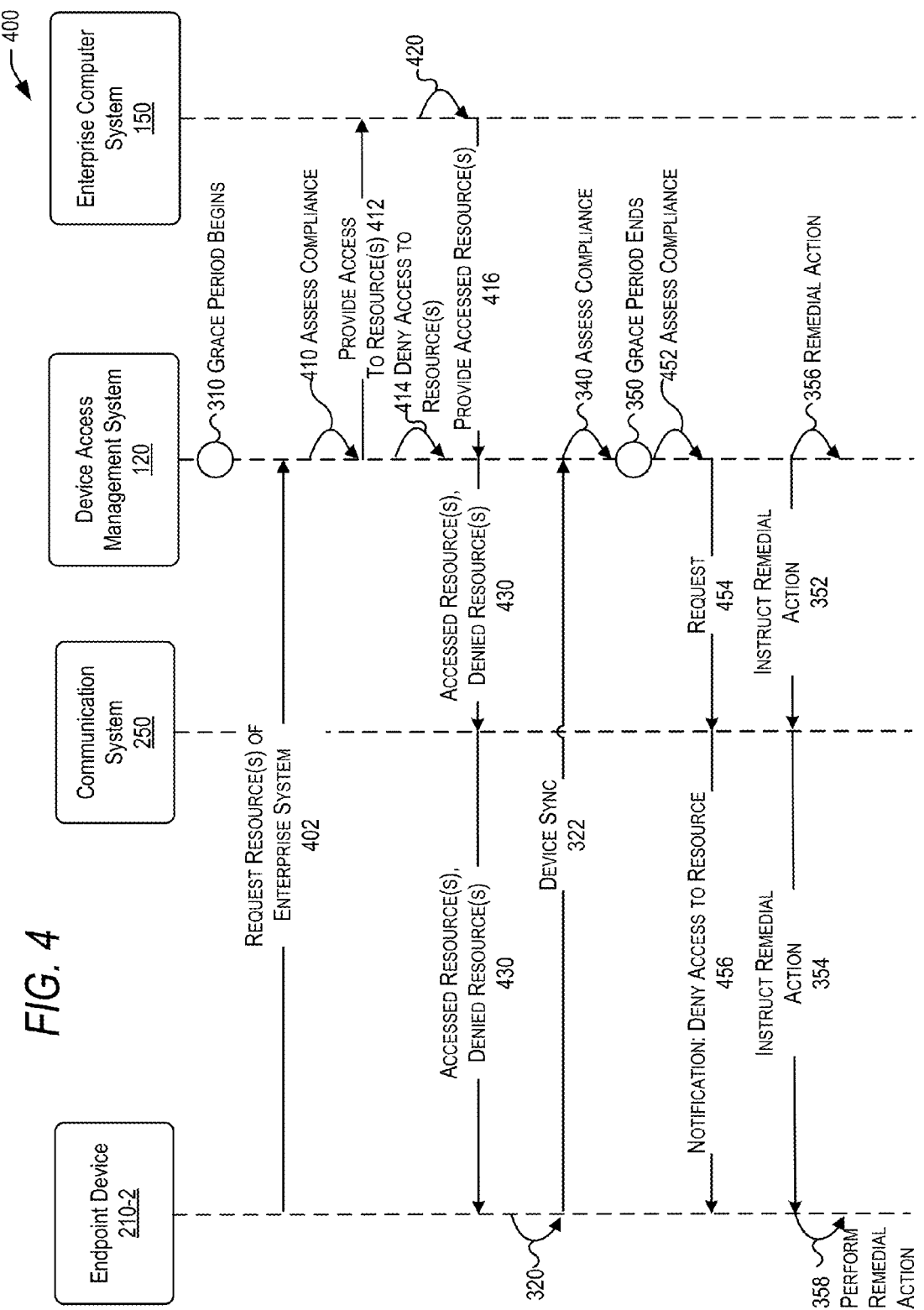
FIG. 4 illustrates a sequence of operations for managing compliance of remote devices that access an enterprise system according to some embodiments of the present invention.

FIG. 4 illustrates a sequence of operations 400 for managing compliance of remote devices that access an enterprise system according to some embodiments of the present invention. Specifically, FIG. 4 illustrates an example of operations 400 that are performed for providing access to a resource in enterprise computer system 150 based on non-compliance of endpoint device 380. The example in FIG. 4 is described below with reference to parts of the example from FIG. 3.

At 310, device access management system 120 may determine that a grace period for non-compliance of endpoint device 380 has begun. During the grace period, an endpoint device 380 may request 402 access to one or more resources in enterprise computer system 150.

Device access management system 120 may perform operations 410 to determine access to the resource(s) indicated by request 402. Compliance may be assessed to determine access to a resource. In some embodiments, access to resource(s) may be denied entirely based on a non-compliance. However, access to resources may be determined based on a level of non-compliance assessed for the non-compliance. As explained below, access to resource(s) may be determined based on a variety of factors including a level of non-compliance for a non-compliance and a user role.

In some embodiments, access to resource(s) may be defined based on a level of non-compliance. One or more resources may be defined for each of the levels of non-compliances. The resource(s) may be defined as those that are permitted from being access or those that are not accessible based on the level of non-compliance. In some embodiments, access to a resource may be defined by a compliance threshold. A compliance threshold may be defined based on a level of non-compliance, the number of occurrences of non-compliance, a user role, or combinations thereof. In one example, access to a resource may be provided based on determining that an assessed level of non-compliance satisfies a compliance threshold. Access to the computing resource may be denied based on determining that the level of non-compliance does not satisfy the compliance threshold.

Based on the access determined for the resource(s) indicated by request 402, device access management system 120 may perform operations 412 to provide access to resource(s) that are permitted for access and may perform operations 414 to deny access to resource(s) that are denied for access. In some embodiments, access to some resource may be permitted and access to some resources may be denied. Access may be provided to endpoint device 380 accordingly based on the resource(s) requested.

Enterprise computer system 150 may perform operations 420 to provide access to the resource(s) that are permitted during the grace period. Enterprise computer system 150 may communicate with device access management system 120 to provide access to the resource(s) ("accessed resource(s)"). Device access management system 120 may communicate 430 with endpoint device 380 to provide the accessed resource(s) and to indicate the denied resource(s). Communication 430 may be facilitated through communication system.

During the grace period, device access management system 120 may assess compliance 340. Compliance may be assessed periodically based on device information. Device information may be received from endpoint device 380 via device sync 322. Compliance may be assessed to determine whether compliance has changed (e.g., whether non-compliance has been remedied). Assessing compliance 340 may include determining whether the resource(s) previously denied are permitted to be accessed based on the non-compliance being remedied. In some embodiments, access to the denied resource(s) may be permitted.

Device access management system 120 may determine whether the grace period has expired, at 350. Upon determining that the grace period has expired, device access management system 120 may assess compliance 452 to determine whether the non-compliance has been remedied. For the resource(s) that were requested 402, device access management system 120 may determine whether access to any of those resource(s) has been provided. Based on the non-compliance, device access management system 120 may determine whether to deny access to the accessed resource(s). Access to resource(s) may be determined based on a level of non-compliance and/or a user role. In some embodiments, access to enterprise computer system 150 may be denied in its entirety based on the non-compliance. Based on determining the non-compliance, device access management system 120 may cause a notification to be sent to endpoint device 380 indicating the resource(s) for which access is denied. In some embodiments, the notification may be sent by communication system 250 based on a request 454 from device access management system 120.

In some embodiments, device access management system 120 may perform operations including instructing endpoint device 380 to take a remedial action and/or taking remedial actions 356 including denying access to the resource(s) based on the non-compliance.

The following FIGS. 5-8 illustrate examples of data managed by device access management system 120 to manage compliance of remote devices registered to access an enterprise system. Specifically, FIGS. 5-8 show examples of techniques for storing information related to managing compliance and how that information is managed (e.g., created, updated, read, or deleted). In some embodiments, device access management system 120 may employ the use of one or more data structures to store information.

Figure 5:
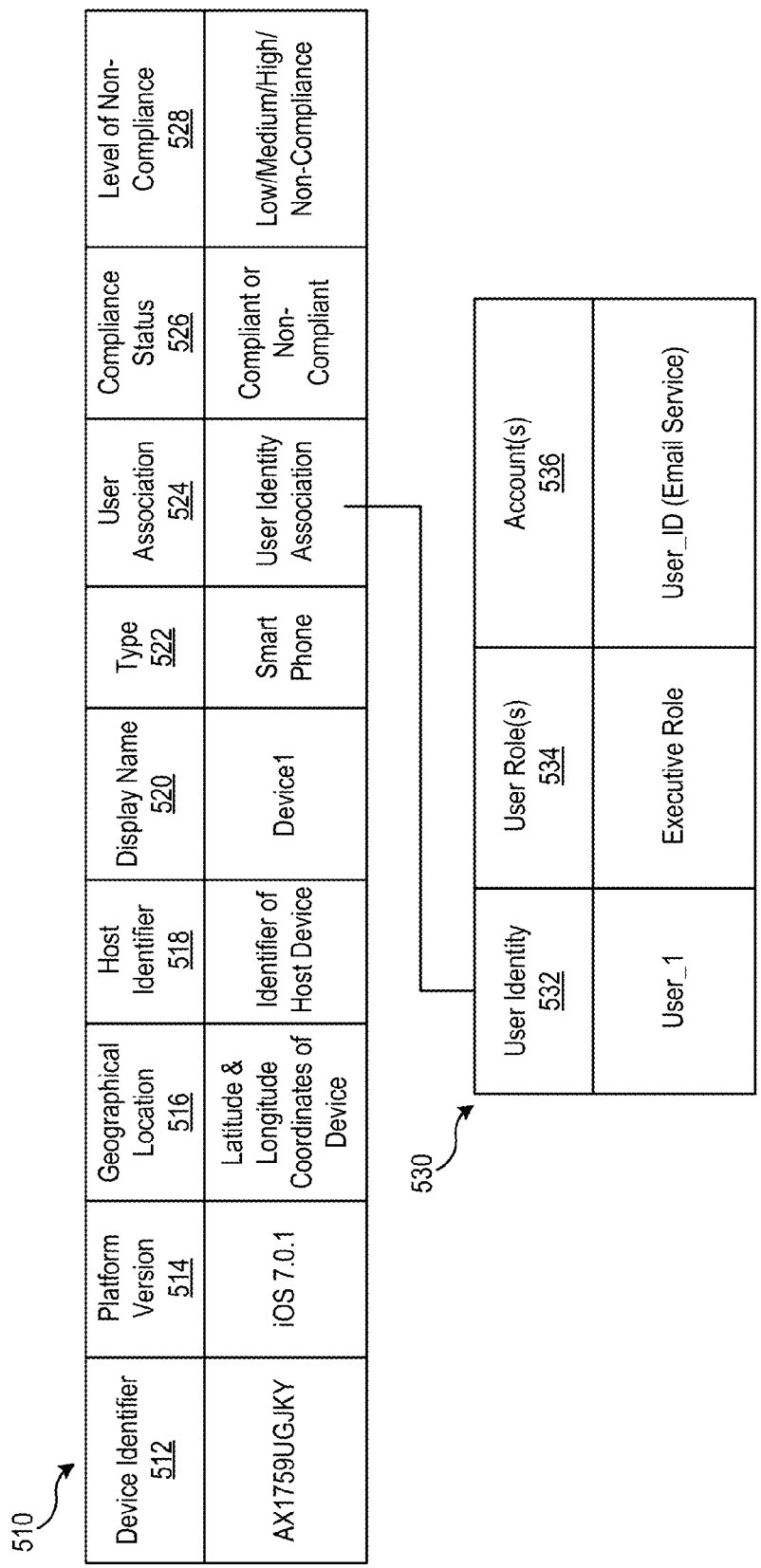
FIG. 5 depicts example of a data structure for storing information for remote devices registered to access an enterprise system according to some embodiments of the present invention.

Now turning to FIG. 5, an example of a data structure 510 ("device record") is depicted. Data structure 510 may store information about a remote device registered to access an enterprise system according to some embodiments of the present invention. One or more data structures like data structure 510 may be created to store information about a plurality of remote devices. The information stored in data structure 510 for a remote device may be considered for assessing compliance of the remote device. Data structure 510 may store compliance information relating to compliance of a remote device identified by information in data structure 510.

Data structure 510 may be implemented as one or a combination of different types of data structures including, without restriction, an array, a record, a relational database table, a hash table, a linked list, or other types of data structures. For purposes of illustration, data structure 510 is shown in an arrangement with a particular number of fields (e.g., fields 512-528); however, data structure 510 may be defined by more or fewer fields in different arrangement than shown. Each instance of data structure 510 may be stored in a data store such as device registry 162.

In the example shown n FIG. 5, compliance information may be stored in data structure 510 for a remote device. The compliance information may be related to compliance of a remote device accessing an enterprise system. For example, field 526 in data structure 510 may include compliance status information, which indicates a compliance status of a remote device identified by data structure 510. Field 528 may indicate a level of non-compliance.

Data structure 510 may include a field 512 ("Device Identifier") that includes a device identifier (e.g., "AX1759UGJKY") of a remote device registered to access an enterprise system. Examples of a device identifier may include, without limitation, a hardware device identifier of a remote device, a token generated for registration of a remote device with an enterprise system, a UDID, or other type of identifier that can be associated with a remote device and that can uniquely identify the remote device from amongst other remote devices that are registered.

Data structure 510 may include a field 514 ("Platform Version") that includes information identifying a version of a platform configured on a remote device. Examples of a platform version, without limitation, include an operating system (OS) version installed on a remote device, a hardware platform installed on a remote device, or other software installed on a remote device for operation of the remote device.

Field 516 ("Geographical Location") may indicate a geographical location of a remote device. For example, field 516 may include information indicating coordinates (e.g., longitude and latitude coordinates) of a last known physical geographical location of the remote device. The geographical location may be determined by a global positioning system (GPS) included in or accessible to the remote device.

Field 518 ("Host Identifier") may indicate an identifier of a host system. For example, when remote device is an endpoint hosted on another device ("host device"), host identifier may indicate an identifier of the host device. A device identifier of the host device is one example of a host identifier. In some embodiments, a host device may be registered for the remote device, and compliance of a remote device may be assessed based on compliance of the host device.

One or more fields of data structure 510 may include information descriptive of a remote device. For example, field 520 ("Display Name") may indicate a display name (e.g., "device1") of a remote device. Descriptive information about a remote device may be provided during enrollment of the remote device. The descriptive information may be used to differentiate one remote device registered for a user from other remote devices registered for that user.

In some embodiments, device records may be associated a user identity established for accessing an enterprise system. As explained above, a remote device may be registered for use by one or more user identities to access an enterprise system. A user identity used to register a remote device may be associated with the device record for that remote device. For example, field 524 may include information indicating a user association with one or more user identities established for accessing an enterprise system. Field 524 may include indicating a location in storage of user identity information. In the example shown in FIG. 5, field 524 may include a reference to a location in memory where a data structure 530 is stored. Data structure 530 may include user identity information corresponding to a user identity associated with the remote device.

A user identity may be established by an identity management system (e.g., identity management system 140). Data structure 530 may be created and managed by the identity management system. Data structure 530 may be stored in a user identity data store 170 accessible to device access management system 120. In some embodiments, device access management system 120 may communicate with identity management system 140 to obtain user identity information associated with a remote device. Shown in FIG. 5 is an example of data structure 530 that stores data about a user identity. Data structure 530 may include a field 532 ("User Identity") that indicates a user identity (e.g., User_1). Data structure 530 may also include data related to registration of the user identity. For example, field 534 in data structure 530 may indicate one or more roles associated with a user identity. Data structure 530 may include field 536 that indicates one or more accounts for accessing one or more resources. Each account may be registered to the user identity. For example, accounts 536 may indicate a user identity (e.g., User_ID) of an account that provides access to an email service.

Based on the user identity association indicated by field 524, one or more roles may be determined from data structure 530 for a user identity associated with a remote device. The role(s) may be used to determine compliance for the remote device.

Compliance information can be stored in data structure 510 for a remote device. The compliance information may be related to compliance of a remote device accessing an enterprise system. Field 526 in data structure 510 may include compliance status information, which indicates a compliance status of a remote device identified by data structure 510. Field 528 may indicate a level of non-compliance.

Figure 6:
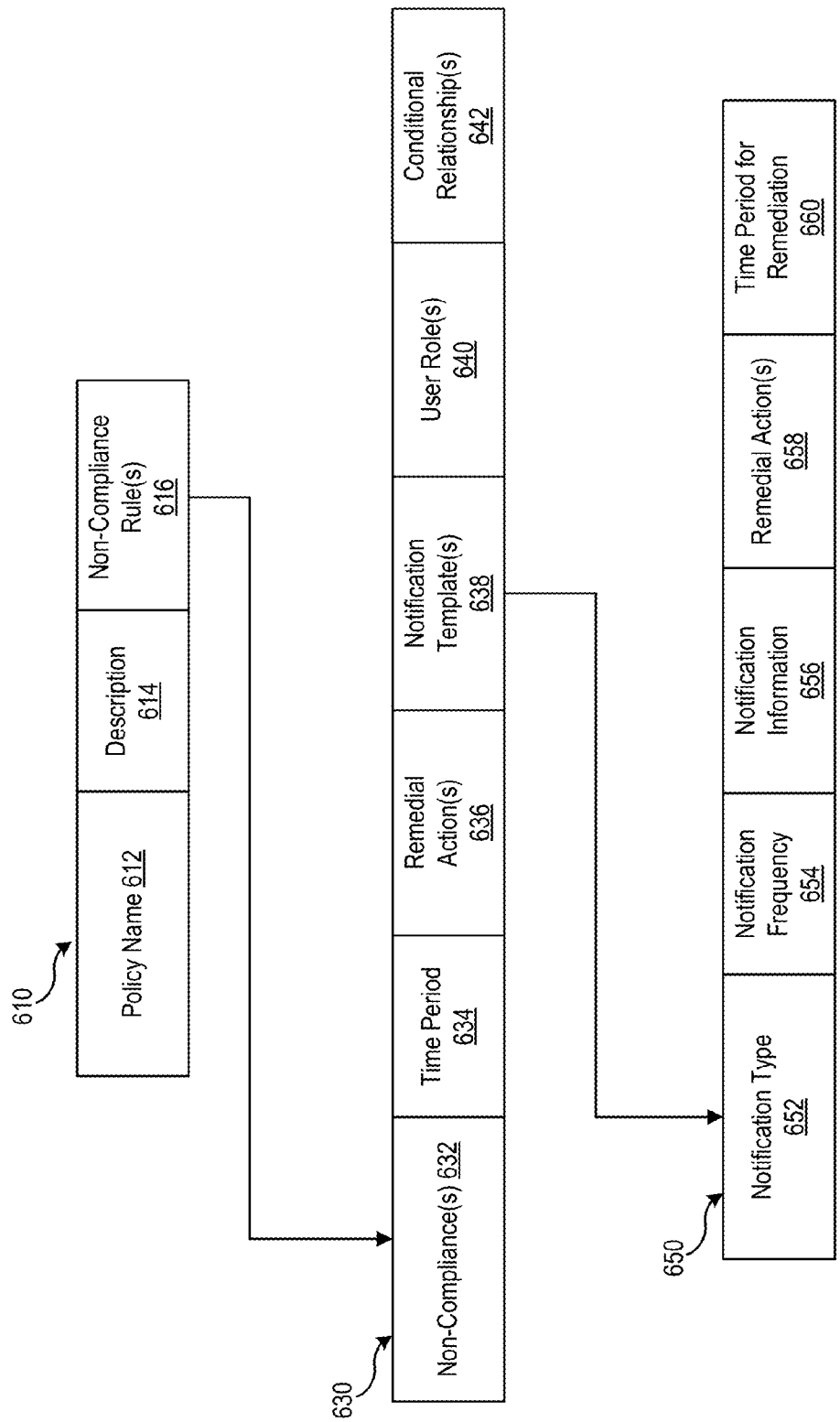
FIG. 6 depicts an example of data structures for storing information about a compliance policy for managing compliance for an enterprise system according to some embodiments of the present invention.

FIG. 6 depicts an example of data structures 610, 630, 650 for storing information about a compliance policy for managing compliance for an enterprise system according to some embodiments of the present invention. A compliance policy may be used to manage compliance for remote devices accessing an enterprise system.

A compliance policy may be stored in many different ways. For example, data structure 610 may be created to store information about a compliance policy. Data structure 610 may store information about multiple compliance policies. Data structure 610 may include information indicating a reference to a location in memory of one or more data structures that store information about a compliance policy. Data structure 610 may include a reference to a location in memory of data structure 630 storing one or more compliance rules for a compliance policy. Data structure 630 may include information indicating a reference to a location in memory of one or more data structures that store information about one or more notification templates for notifying a user about a non-compliance.

Each of data structures 610, 630, 650 may be implemented as one or a combination of different types of data structures including, without restriction, an array, a record, a relational database table, a hash table, a linked list, or other types of data structures. For purposes of illustration, data structures 610, 630, 650 are each shown in an arrangement with a particular number of fields; however, each of data structures 610, 630, 650 may be defined by more or fewer fields in different arrangement than shown. Each instance of data structures 610, 630 may be stored in a data store such as policies data store 164. Each instance of data structure 650 may be stored in policies data store 164 and/or notification templates data store 166.

Data structure 610 may include descriptive information about one or more compliance policies. For example, data structure 610 may include a field 612 that indicates a policy name of a compliance policy ("Policy Name") and a field 614 ("Description") of the compliance policy. Data structure 610 may include one or more fields 616 including information about one or more non-compliance rules. One or more compliance rules may be stored in a data structure, such as data structure 630. In some embodiments, field 616 may include a reference to a location in memory of a data structure (e.g., data structure 630) storing a compliance rule.

Data structure 630 may include a field 632 ("Non-Compliance(s)") including one or more non-compliances. Examples of non-compliances are described with reference to FIGS. 7 and 8. Data structure 630 may include a field 634 ("Time Period") that indicates a time period (e.g., a grace period) for remediation of the non-compliances indicated by field 632. Field 636 ("Remedial Action(s)") may include information indicating one or more remedial actions for remediation of the non-compliances indicated by field 632.

In some embodiments, data structure 630 may include field 640 ("User Role(s)"), which indicates one or more user roles defined for the non-compliances indicated by field 632. The non-compliances indicated by field 632 may be defined for those user roles indicates by field 640. In some embodiments, field 642 may indicate one or more conditional relationships between the non-compliance(s) indicated by field 632 and the user role(s) indicated by field 640. A conditional relationship may be expressed using one or more conditional operators. Examples of conditional relationships are described with reference to FIGS. 7 and 8.

A compliance policy may include information indicating a configuration for notification of information about non-compliances. For example, data structure 630 may include field 638 that includes information indicating a reference to a location in memory of a data structure 650. Data structure 650 may include a configuration for notification. A notification may be configured during enrollment of a remote device to access an enterprise system. For example, data structure 650 may indicate information to facilitate providing a notification to a remote device. In some embodiments, a notification may be a message with instructions indicating one or more remedial actions for a non-compliance. The instruction(s) may cause a remote device to perform a remedial action.

Field 652 ("Notification Type") may include information indicating a type of notification, such as an email, an SMS message, or other types of electronic messages. Field 654 ("Notification Frequency") may indicate a notification frequency. Notification frequency may indicate how often a notification is to be sent to a remote device.

Field 656 ("Notification Information") may include information to be provided in a notification. For each type of notification, notification information may be specified. As such, a different type of notification may be defined based on different notification information. Notification information may indicate the non-compliance(s). Notification information may indicate the resource(s) that are permitted and/or denied for access.

Field 658 ("Remedial Action(s)") may include information indicating the remedial action(s) to remedy a non-compliance. In some embodiments, field 658 may indicate one or more instructions that may cause a remote device to perform the remedial action(s).

Field 660 ("Time Period for Remediation") may include information indicating a time period for remediation of a non-compliance.

FIG. 7 depicts an example a compliance policy indicating non-compliances and remedial actions for the non-compliances according to some embodiments of the present invention. As explained above, a compliance policy may be stored in many different ways. For example, a data structure 710 may be created to store a compliance policy. Data structure 710 may be included or referenced by data structures described above.

Data structure 710 may be implemented as one or a combination of different types of data structures including, without restriction, an array, a record, a relational database table, a hash table, a linked list, or other types of data structures. For purposes of illustration, data structure 710 is each shown in an arrangement with a particular number of fields (e.g., fields 712-718); however, data structure 710 may be defined by more or fewer fields in different arrangement than shown. Each instance of data structure 710 may be stored in a data store such as policies data store 164.

Field 712 ("Non-Compliance(s)") may include information defining one or more non-compliances. Examples of non-compliances may include, without limitation, altering a hardware configuration of a remote device, altering a software configuration of a remote device, installing an application (e.g., a blacklisted application) on a remote device, uninstalling an application (e.g., a required application) on a remote device, using a remote device in a manner that is non-compliant with a policy related to registration of the remote device to access an enterprise system, adjusting a security configuration of a remote device in a manner that is non-compliant with a security policy for accessing an enterprise system, password policy violation (e.g., non-conforming password for a remote device), loss of a remote device, theft of a remote device, or inactivity corresponding to use of a remote device.

Field 714 ("User Role(s)") may include information indicating one or more roles defined for a non-compliance. Examples of user roles may include, without limitation, an executive, an employee, an administrator, a tester, a developer, and a customer.

Field 716 ("Remedial Action(s)") may include information indicating the remedial action(s) that can be performed during a time period indicated by field 718 ("Time Period"). In some embodiments, field 716 may indicate one or more instructions that may cause a remote device to perform the remedial action(s).

FIG. 7 shows several examples of non-compliances stored in data structure 710. In a first example, entry 730 in data structure 710 may indicate non-compliances 712 including a non-conforming password for an application or installation of an unauthorized (e.g., blacklisted) application defined for user roles 714 including an executive and an employee. For entry 730, a remedial action 716 may include causing application to be removed. The time period 718 for taking the remedial action may be 24 hours.

In a second example, entry 740 in data structure 710 may indicate non-compliances 712 including inactivity of an endpoint device defined for user roles 714 including an employee and a manager. For entry 740, a remedial action 716 may include requesting a response and authentication of a user. The time period 718 for taking the remedial action may be 48 hours.

In a third example, entry 750 in data structure 710 may indicate non-compliances 712 including violation of device enrollment criteria defined for user roles 714 including an employee and a contractor. For entry 750, a remedial action 716 may include locking a remote device identified as non-compliance. The time period 718 for taking the remedial action may be 2 hours.

In a fourth example, entry 760 in data structure 710 may indicate non-compliances 712 including altering a hardware or a software configuration on a remote device defined for user roles 714 including all user roles for an enterprise. For entry 760, a remedial action 716 may include causing the memory of the remote device to be wiped or unregistering the remote device from access to an enterprise system. The time period 718 for taking the remedial action may not be defined.

FIG. 8 depicts an example a compliance policy indicating levels of non-compliance and remedial actions corresponding to the levels according to some embodiments of the present invention. Data structure 810 may be created to store a compliance policy. Data structure 810 may be included or referenced by data structures described above.

Data structure 810 may be implemented as one or a combination of different types of data structures including, without restriction, an array, a record, a relational database table, a hash table, a linked list, or other types of data structures. For purposes of illustration, data structure 810 is each shown in an arrangement with a particular number of fields (e.g., fields 812-820); however, data structure 810 may be defined by more or fewer fields in different arrangement than shown. Each instance of data structure 810 may be stored in a data store such as policies data store 164.

Field 812 ("Non-Compliance Levels") may include information defining a level of non-compliance. A level of non-compliance may be defined by one or more non-compliances indicated by information in field 814 ("Non-Compliance(s)").

Field 816 ("User Role(s)") may include information indicating one or more roles defined for a level of non-compliance. User roles may be defined as roles that are excluded from the non-compliances defined by the level of non-compliance. User roles may be defined as the roles for which non-compliance is assessed for the level of non-compliance.

Field 818 ("Resources(s) Not Permitted for Access") may include information indicating one or more resources that are not permitted for access by a user with one of user roles 816 when non-compliance is detected for a remote device registered with the user. In some embodiments, field 818 may indicate resources that are permitted. Access to resources may be defined based on the resources indicated in field 818 for an assessed level of compliance during time period 820 for that assessed level. Access may not be permitted unless a remedial action is taken during the time period.

In some embodiments, a level of non-compliance may be assessed by finding a matching non-compliance level in one of the levels of non-compliance. The level of non-compliance may be assessed as the level with a matching non-compliance. A level of non-compliance may be further assessed based on whether the remote device that non-compliant is registered for a user associated with one of the user roles defined for that level. A level of non-compliance may be further assessed based on whether the non-compliance for the level occurs during a time period defined for that level. Although not described, one or more remedial actions may be defined for a non-compliance with respect to a level of non-compliance.

FIG. 8 shows several examples of non-compliances stored in data structure 810. In a first example, entry 830 in data structure 810 may indicate "low" level of non-compliance defined by non-compliances 814 including a non-conforming password for an application or installation of an unauthorized (e.g., blacklisted) application in entry 830. Entry 830 may indicate user roles 816 including an executive and an employee for which the level of non-compliance is to be assessed. For entry 830, time period 820 may indicate 24 hours during which remedial action can be taken to gain access to the resource(s) (e.g., HR application) indicated by field 818.

In a second example, entry 840 in data structure 810 may indicate "medium" level of non-compliance defined by non-compliances 814 including inactivity of an endpoint device. Entry 840 may indicate user roles 816 including an employee and a manager for which the level of non-compliance is to be assessed. For entry 840, time period 820 may indicate 48 hours during which remedial action can be taken to gain access to the resource(s) (e.g., HR application) indicated by field 818.

In a third example, entry 850 in data structure 810 may indicate "high" level of non-compliance defined by non-compliances 814 including violation of device enrollment criteria. Entry 850 may indicate user roles 816 including an employee and a contractor for which the level of non-compliance is to be assessed. For entry 850, time period 820 may indicate 2 hours during which remedial action can be taken to gain access to the resource(s) (e.g., Corporate Intranet Web Services) indicated by field 818.

In a fourth example, entry 860 in data structure 810 may indicate "fully non-compliant" level of non-compliance defined by non-compliances 814 including altering a hardware or a software configuration on a remote device. Entry 860 may indicate user roles 816 including all user roles for which the level of non-compliance is to be assessed. For entry 860, time period 820 may not be defined or not granted for taking remedial action to gain access to the resource(s) (e.g., all resources) indicated by field 818.

Figure 9:
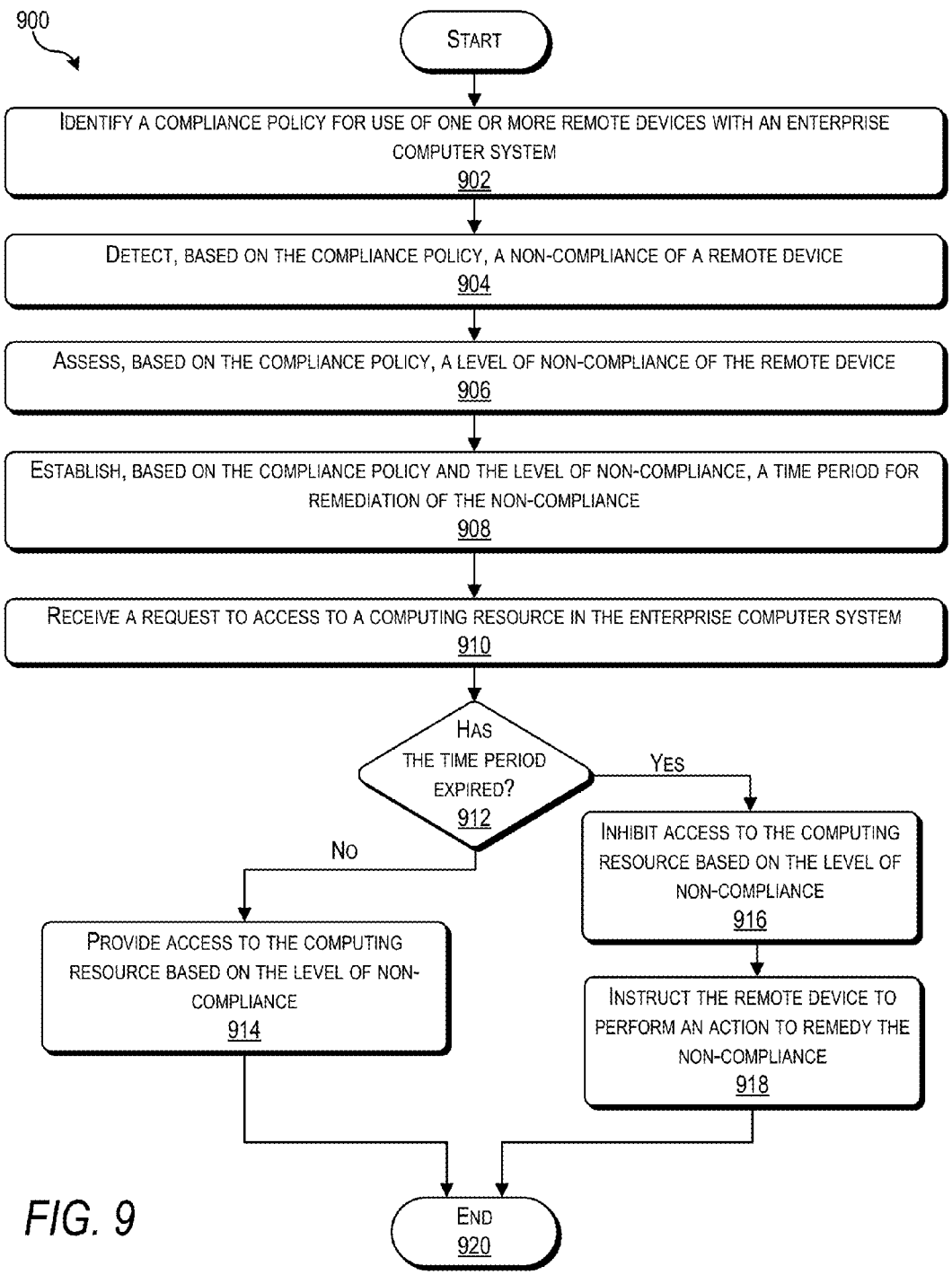
FIG. 9 is a flowchart illustrating a process for managing compliance of remote devices that access an enterprise system according to some embodiments of the present invention.

Now turning to FIG. 9 is a flowchart 900 illustrating a process for managing compliance of devices that access an enterprise system according to some embodiments of the present invention. In some embodiments, the process depicted in FIG. 9 may be implemented by device access management system 120 of FIG. 1 described herein.

The process depicted by flowchart 900 may be implemented in software (e.g., code, instructions, program) executed by one or more processing units (e.g., processors cores), hardware, or combinations thereof. The software may be stored in memory (e.g., on a memory device, on a non-transitory computer-readable storage medium). The particular series of processing steps of flowchart 900 is not intended to be limiting. Other sequences of steps may also be performed according to alternative embodiments. For example, alternative embodiments of the present invention may perform the steps outlined above in a different order. Moreover, the individual steps illustrated in FIG. 9 may include multiple sub-steps that may be performed in various sequences as appropriate to the individual step. Furthermore, additional steps may be added or removed depending on the particular applications. While processing depicted in FIG. 9 is with respect to a single non-compliance of a remote device accessing an enterprise system, the processing may be performed for multiple different non-compliances of the remote device accessing the enterprise system. While processing depicted in FIG. 9 is with respect to a request for a computing resource, the processing may be performed for multiple computing resources requested from a remote device that accesses the enterprise system. One of ordinary skill in the art would recognize many variations, modifications, and alternatives.

The processing in flowchart 900 is initiated, at step 902, by identifying a compliance policy for use of one or more remote devices with an enterprise computer system. For example, device access management system 120 can identify a compliance policy in policies data store 164. A compliance policy may be used to manage compliance for one or more remote devices (e.g., endpoint devices 108) used with enterprise computer system. A compliance policy may be identified from a plurality of compliance policies based on one or more attributes including, but not limited to, a user role for accessing the enterprise computer system, a type of remote device, a device attribute (e.g., a type of platform supported for a remote device), a geographical location of a remote device, or combinations thereof. Examples of compliance policies are described with reference to FIG. 6.

Based on a compliance policy (e.g., the compliance policy identified at step 902), a non-compliance of a remote device may be detected, at step 904. As described above, a compliance policy may indicate one or more non-compliances. Device information obtained (e.g., device synchronization) from the remote device may be assessed to determine whether the state of the remote device and/or use of the remote device matches a non-compliance identified in the compliance policy. Multiple non-compliances may be detected although processing is described with respect to a single non-compliance. Some or all of the detected non-compliances may be different types of non-compliances.

At step 906, a level of non-compliance of a remote device may be assessed based on a compliance policy (e.g., the compliance policy identified at step 902). A detected non-compliance may be compared to the non-compliance(s) defined for each of the levels of non-compliance. The non-compliance may be assessed to a level of non-compliance that includes a non-compliance matching the detected non-compliance. Examples of levels of non-compliance are described with reference to FIGS. 7 and 8. In some embodiments, when a non-compliance does not match any of the non-compliances in the levels of non-compliances, a default level of non-compliance may be assessed.

In some embodiments, each of the non-compliances may be assessed to a different level of non-compliance. A compliance policy may define a rule for selecting a level of non-compliance from the different levels of non-compliance. For example, a rule may indicate that the more restrictive level of non-compliance be assessed for the non-compliances.

A time period for remediation of a non-compliance (e.g., the non-compliance detected at step 904) is established, at step 908. The time period may begin when it is established. Establishing the time period may include accessing the compliance policy used to detected a non-compliance to determine a time period for remediation of the non-compliance. The compliance policy may indicate a time period for performing remedial action for each level of non-compliance. In some embodiments, the time period may be determined based on the level of non-compliance assessed for the non-compliance. For example, a time period may be defined for each of the levels of non-compliance. In some embodiments, when multiple different levels of non-compliances have been assessed for multiple non-compliances, the time period may be established based a rule for choosing a time period based on different levels of non-compliance. For example, a rule may be defined that indicates the time period is to be established based on the more restrictive level of compliance.

At step 910, a request is received to access a resource (e.g., a computing resource) from the enterprise computer system. The request may be received before or after the time period for remediation; however, the request may be processed after the time period has been established.

At step 912, a determination is made as to whether the time period has expired. In some embodiments, access to an enterprise computer system may vary based on whether the time period has expired. In some embodiments, although a request to access a resource is received before the time period, the resource may be inaccessible because the time period expires after the request is received and before access to the resource has been provided. Access to the enterprise computer system may be denied entirely. In some embodiments, access to a resource may be determined based on the level of non-compliance. Resources permitted to be accessed and/or resources denied for access may be defined for the levels of compliance.

Based on determining that the time period has expired, access to the resource may be inhibited based on the level of compliance, at step 916. At step 918, a message may be transmitted to a remote device that requested the resource. The message may indicate an instruction to perform an action to remedy the non-compliance. Based on determining that the time period has not expired, access to a resource may be provided, at step 914, based on the level of non-compliance. The resource may be one which is permitted for access based on the level of non-compliance. In some embodiments, before the time period expires, resources may be accessed from an enterprise computer system regardless of the level of non-compliance. Processing for flowchart 900 may end at step 920.

Figure 10:
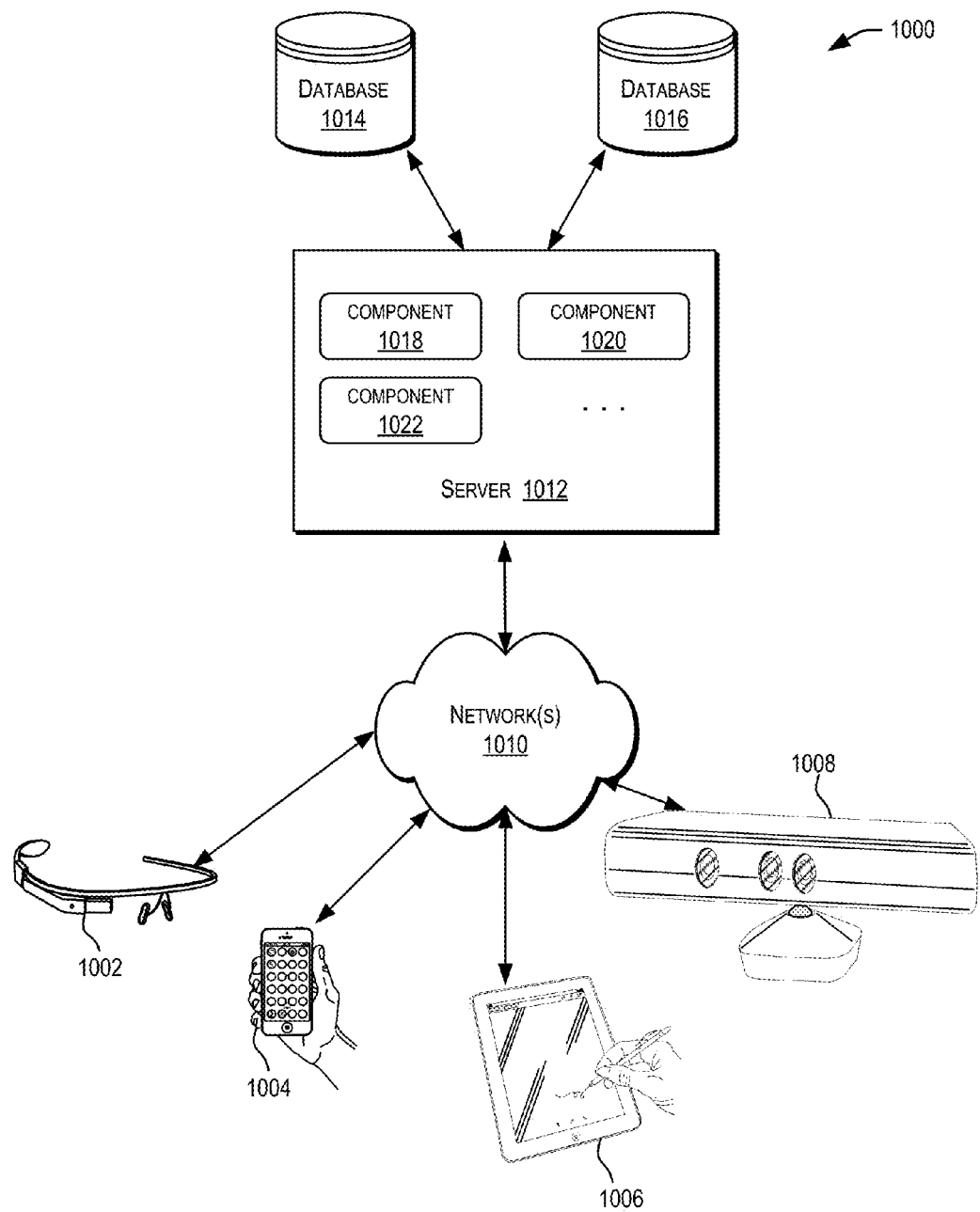
FIG. 10 depicts a simplified diagram of a distributed system for implementing an embodiment.

FIG. 10 depicts a simplified diagram of a distributed system 1000 for implementing an embodiment. In the illustrated embodiment, distributed system 1000 includes one or more client computing devices 1002, 1004, 1006, and 1008, which are configured to execute and operate a client application such as a web browser, proprietary client (e.g., Oracle Forms), or the like over one or more network(s) 1010. Server 1012 may be communicatively coupled with remote client computing devices 1002, 1004, 1006, and 1008 via network 1010.

In various embodiments, server 1012 may be adapted to run one or more services or software applications such as services and applications that may implement a device access management system for managing compliance of remote devices that access an enterprise system. In certain embodiments, server 1012 may also provide other services or software applications can include non-virtual and virtual environments. In some embodiments, these services may be offered as web-based or cloud services or under a Software as a Service (SaaS) model to the users of client computing devices 1002, 1004, 1006, and/or 1008. Users operating client computing devices 1002, 1004, 1006, and/or 1008 may in turn utilize one or more client applications to interact with server 1012 to utilize the services provided by these components.

In the configuration depicted in FIG. 10, software components 1018, 1020 and 1022 of system 1000 are shown as being implemented on server 1012. In other embodiments, one or more of the components of system 1000 and/or the services provided by these components may also be implemented by one or more of the client computing devices 1002, 1004, 1006, and/or 1008. Users operating the client computing devices may then utilize one or more client applications to use the services provided by these components. These components may be implemented in hardware, firmware, software, or combinations thereof. It should be appreciated that various different system configurations are possible, which may be different from distributed system 1000. The embodiment shown in FIG. 10 is thus one example of a distributed system for implementing an embodiment system and is not intended to be limiting.

Client computing devices 1002, 1004, 1006, and/or 1008 may include various types of computing systems. For example, a client computing device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry® 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over network(s) 1010.

Although distributed system 1000 in FIG. 10 is shown with four client computing devices, any number of client computing devices may be supported. Other devices, such as devices with sensors, etc., may interact with server 1012.

Network(s) 1010 in distributed system 1000 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, network(s) 1010 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

Server 1012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 1012 can include one or more virtual machines running virtual operating systems, or other computing architectures involving virtualization. One or more flexible pools of logical storage devices can be virtualized to maintain virtual storage devices for the server. Virtual networks can be controlled by server 1012 using software defined networking. In various embodiments, server 1012 may be adapted to run one or more services or software applications described in the foregoing disclosure. For example, server 1012 may correspond to a server for performing processing as described above according to an embodiment of the present disclosure.

Server 1012 may run an operating system including any of those discussed above, as well as any commercially available server operating system. Server 1012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 1012 may include one or more applications to analyze and consolidate data feeds and/or event updates received from users of client computing devices 1002, 1004, 1006, and 1008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 1012 may also include one or more applications to display the data feeds and/or real-time events via one or more display devices of client computing devices 1002, 1004, 1006, and 1008.

Distributed system 1000 may also include one or more databases 1014 and 1016. These databases may provide a mechanism for storing information such as user interactions information, usage patterns information, adaptation rules information, and other information used by embodiments of the present invention. Databases 1014 and 1016 may reside in a variety of locations. By way of example, one or more of databases 1014 and 1016 may reside on a non-transitory storage medium local to (and/or resident in) server 1012. Alternatively, databases 1014 and 1016 may be remote from server 1012 and in communication with server 1012 via a network-based or dedicated connection. In one set of embodiments, databases 1014 and 1016 may reside in a storage-area network (SAN). Similarly, any necessary files for performing the functions attributed to server 1012 may be stored locally on server 1012 and/or remotely, as appropriate. In one set of embodiments, databases 1014 and 1016 may include relational databases, such as databases provided by Oracle that are adapted to store, update, and retrieve data in response to SQL-formatted commands.

Figure 11:
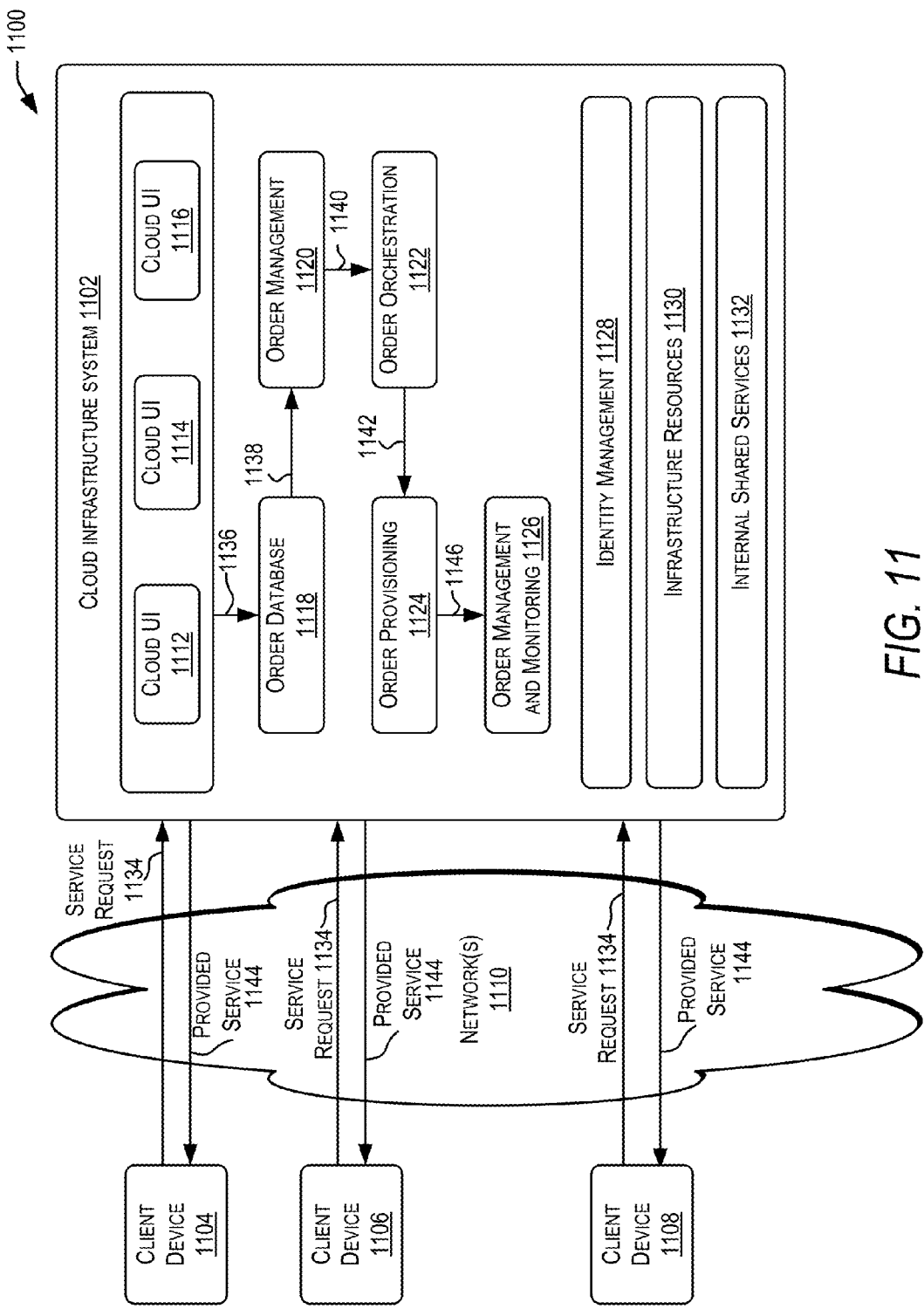
FIG. 11 is a simplified block diagram of one or more components of a system environment in which services may be offered as cloud services, in accordance with an embodiment of the present disclosure.

In some embodiments, a cloud environment may provide one or more services for managing compliance of remote devices that access an enterprise system. FIG. 11 is a simplified block diagram of one or more components of a system environment 1100 in which services may be offered as cloud services, in accordance with an embodiment of the present disclosure. In the illustrated embodiment in FIG. 11, system environment 1100 includes one or more client computing devices 1104, 1106, and 1108 that may be used by users to interact with a cloud infrastructure system 1102 that provides cloud services, including services for managing compliance of remote devices that access an enterprise system. Cloud infrastructure system 1102 may comprise one or more computers and/or servers that may include those described above for server 1012.

It should be appreciated that cloud infrastructure system 1102 depicted in FIG. 11 may have other components than those depicted. Further, the embodiment shown in FIG. 11 is only one example of a cloud infrastructure system that may incorporate an embodiment of the invention. In some other embodiments, cloud infrastructure system 1102 may have more or fewer components than shown in the figure, may combine two or more components, or may have a different configuration or arrangement of components.

Client computing devices 1104, 1106, and 1108 may be devices similar to those described above for client computing devices 1002, 1004, 1006, and 1008. Client computing devices 1104, 1106, and 1108 may be configured to operate a client application such as a web browser, a proprietary client application (e.g., Oracle Forms), or some other application, which may be used by a user of the client computing device to interact with cloud infrastructure system 1102 to use services provided by cloud infrastructure system 1102. Although exemplary system environment 1100 is shown with three client computing devices, any number of client computing devices may be supported. Other devices such as devices with sensors, etc. may interact with cloud infrastructure system 1102.

Network(s) 1110 may facilitate communications and exchange of data between client computing devices 1104, 1106, and 1108 and cloud infrastructure system 1102. Each network may be any type of network familiar to those skilled in the art that can support data communications using any of a variety of commercially-available protocols, including those described above for network(s) 1010.

In certain embodiments, services provided by cloud infrastructure system 1102 may include a host of services that are made available to users of the cloud infrastructure system on demand. In addition to services related to managing compliance of remote devices that access an enterprise system, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 1102 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 1102 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 1102 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 1102 may be adapted to automatically provision, manage and track a customer's subscription to services offered by cloud infrastructure system 1102. Cloud infrastructure system 1102 may provide the cloud services via different deployment models. For example, services may be provided under a public cloud model in which cloud infrastructure system 1102 is owned by an organization selling cloud services (e.g., owned by Oracle Corporation) and the services are made available to the general public or different industry enterprises. As another example, services may be provided under a private cloud model in which cloud infrastructure system 1102 is operated solely for a single organization and may provide services for one or more entities within the organization. The cloud services may also be provided under a community cloud model in which cloud infrastructure system 1102 and the services provided by cloud infrastructure system 1102 are shared by several organizations in a related community. The cloud services may also be provided under a hybrid cloud model, which is a combination of two or more different models.

In some embodiments, the services provided by cloud infrastructure system 1102 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 1102. Cloud infrastructure system 1102 then performs processing to provide the services in the customer's subscription order.

In some embodiments, the services provided by cloud infrastructure system 1102 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 1102 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 1102 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 1102 may also include infrastructure resources 1130 for providing the resources used to provide various services to customers of the cloud infrastructure system. In one embodiment, infrastructure resources 1130 may include pre-integrated and optimized combinations of hardware, such as servers, storage, and networking resources to execute the services provided by the PaaS platform and the SaaS platform, and other resources.

In some embodiments, resources in cloud infrastructure system 1102 may be shared by multiple users and dynamically re-allocated per demand. Additionally, resources may be allocated to users in different time zones. For example, cloud infrastructure system 1102 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 1132 may be provided that are shared by different components or modules of cloud infrastructure system 1102 to enable provision of services by cloud infrastructure system 1102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 1102 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 1102, and the like.

In one embodiment, as depicted in FIG. 11, cloud management functionality may be provided by one or more modules, such as an order management module 1120, an order orchestration module 1122, an order provisioning module 1124, an order management and monitoring module 1126, and an identity management module 1128. These modules may include or be provided using one or more computers and/or servers, which may be general purpose computers, specialized server computers, server farms, server clusters, or any other appropriate arrangement and/or combination.

In an exemplary operation, at step 1134, a customer using a client device, such as client computing devices 1104, 1106 or 1108, may interact with cloud infrastructure system 1102 by requesting one or more services provided by cloud infrastructure system 1102 and placing an order for a subscription for one or more services offered by cloud infrastructure system 1102. In certain embodiments, the customer may access a cloud User Interface (UI) such as cloud UI 1112, cloud UI 1114 and/or cloud UI 1116 and place a subscription order via these UIs. The order information received by cloud infrastructure system 1102 in response to the customer placing an order may include information identifying the customer and one or more services offered by the cloud infrastructure system 1102 that the customer intends to subscribe to.

At step 1136, the order information received from the customer may be stored in an order database 1118. If this is a new order, a new record may be created for the order. In one embodiment, order database 1118 can be one of several databases operated by cloud infrastructure system 1118 and operated in conjunction with other system elements.

At step 1138, the order information may be forwarded to an order management module 1120 that may be configured to perform billing and accounting functions related to the order, such as verifying the order, and upon verification, booking the order.

At step 1140, information regarding the order may be communicated to an order orchestration module 1122 that is configured to orchestrate the provisioning of services and resources for the order placed by the customer. In some instances, order orchestration module 1122 may use the services of order provisioning module 1124 for the provisioning. In certain embodiments, order orchestration module 1122 enables the management of business processes associated with each order and applies business logic to determine whether an order should proceed to provisioning.

As shown in the embodiment depicted in FIG. 11, at step 1142, upon receiving an order for a new subscription, order orchestration module 1122 sends a request to order provisioning module 1124 to allocate resources and configure resources needed to fulfill the subscription order. Order provisioning module 1124 enables the allocation of resources for the services ordered by the customer. Order provisioning module 1124 provides a level of abstraction between the cloud services provided by cloud infrastructure system 1100 and the physical implementation layer that is used to provision the resources for providing the requested services. This enables order orchestration module 1122 to be isolated from implementation details, such as whether or not services and resources are actually provisioned on the fly or pre-provisioned and only allocated/assigned upon request.

At step 1144, once the services and resources are provisioned, a notification may be sent to the subscribing customers indicating that the requested service is now ready for use. In some instance, information (e.g. a link) may be sent to the customer that enables the customer to start using the requested services.

At step 1146, a customer's subscription order may be managed and tracked by an order management and monitoring module 1126. In some instances, order management and monitoring module 1126 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 1100 may include an identity management module 1128 that is configured to provide identity services, such as access management and authorization services in cloud infrastructure system 1100. In some embodiments, identity management module 1128 may control information about customers who wish to utilize the services provided by cloud infrastructure system 1102. Such information can include information that authenticates the identities of such customers and information that describes which actions those customers are authorized to perform relative to various system resources (e.g., files, directories, applications, communication ports, memory segments, etc.) Identity management module 1128 may also include the management of descriptive information about each customer and about how and by whom that descriptive information can be accessed and modified.

Figure 12:
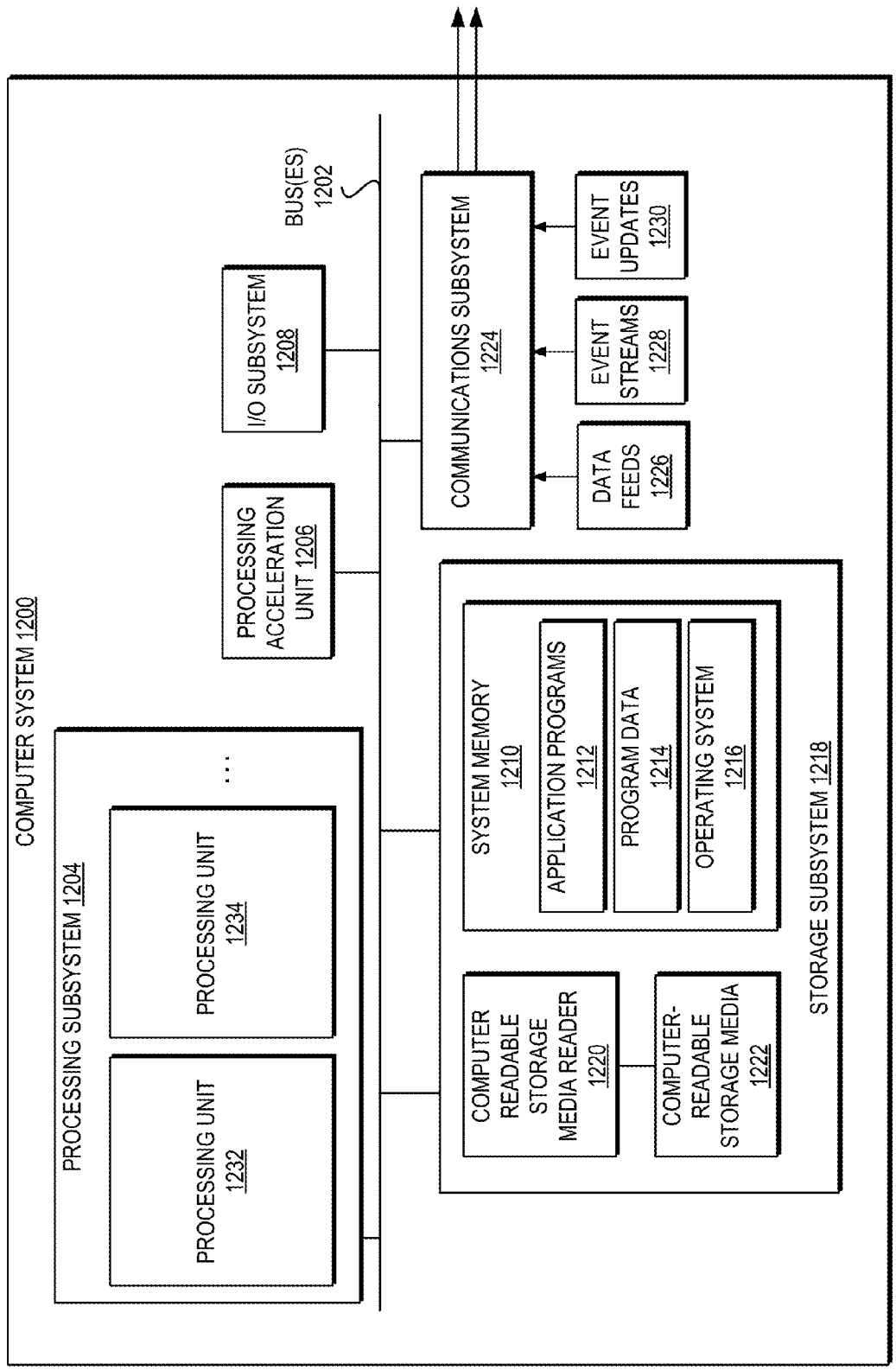
FIG. 12 illustrates an exemplary computer system that may be used to implement an embodiment of the present invention.

FIG. 12 illustrates an exemplary computer system 1200 that may be used to implement an embodiment of the present invention. In some embodiments, computer system 1200 may be used to implement any of the various servers and computer systems described above. As shown in FIG. 12, computer system 1200 includes various subsystems including a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 may include tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1204 controls the operation of computer system 1200 and may comprise one or more processing units 1232, 1234, etc. A processing unit may include be one or more processors, including single core or multicore processors, one or more cores of processors, or combinations thereof. In some embodiments, processing subsystem 1204 can include one or more special purpose co-processors such as graphics processors, digital signal processors (DSPs), or the like. In some embodiments, some or all of the processing units of processing subsystem 1204 can be implemented using customized circuits, such as application specific integrated circuits (ASICs), or field programmable gate arrays (FPGAs).

In some embodiments, the processing units in processing subsystem 1204 can execute instructions stored in system memory 1210 or on computer readable storage media 1222. In various embodiments, the processing units can execute a variety of programs or code instructions and can maintain multiple concurrently executing programs or processes. At any given time, some or all of the program code to be executed can be resident in system memory 1210 and/or on computer-readable storage media 1222 including potentially on one or more storage devices. Through suitable programming, processing subsystem 1204 can provide various functionalities described above for managing compliance of remote devices that access an enterprise system.

In certain embodiments, a processing acceleration unit 1206 may be provided for performing customized processing or for off-loading some of the processing performed by processing subsystem 1204 so as to accelerate the overall processing performed by computer system 1200.

I/O subsystem 1208 may include devices and mechanisms for inputting information to computer system 1200 and/or for outputting information from or via computer system 1200. In general, use of the term "input device" is intended to include all possible types of devices and mechanisms for inputting information to computer system 1200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Ski® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1218 provides a repository or data store for storing information that is used by computer system 1200. Storage subsystem 1218 provides a tangible non-transitory computer-readable storage medium for storing the basic programming and data constructs that provide the functionality of some embodiments. Software (programs, code modules, instructions) that when executed by processing subsystem 1204 provide the functionality described above may be stored in storage subsystem 1218. The software may be executed by one or more processing units of processing subsystem 1204. Storage subsystem 1218 may also provide a repository for storing data used in accordance with the present invention.

Storage subsystem 1218 may include one or more non-transitory memory devices, including volatile and non-volatile memory devices. As shown in FIG. 12, storage subsystem 1218 includes a system memory 1210 and a computer-readable storage media 1222. System memory 1210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1200, such as during start-up, may typically be stored in the ROM. The RAM typically contains data and/or program modules that are presently being operated and executed by processing subsystem 1204. In some implementations, system memory 1210 may include multiple different types of memory, such as static random access memory (SRAM) or dynamic random access memory (DRAM).

By way of example, and not limitation, as depicted in FIG. 12, system memory 1210 may store application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1222 may store programming and data constructs that provide the functionality of some embodiments. Software (programs, code modules, instructions) that when executed by processing subsystem 1204 a processor provide the functionality described above may be stored in storage subsystem 1218. By way of example, computer-readable storage media 1222 may include non-volatile memory such as a hard disk drive, a magnetic disk drive, an optical disk drive such as a CD ROM, DVD, a Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1222 may provide storage of computer-readable instructions, data structures, program modules, and other data for computer system 1200.

In certain embodiments, storage subsystem 1200 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for storing computer-readable information.

In certain embodiments, computer system 1200 may provide support for executing one or more virtual machines. Computer system 1200 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1200. Accordingly, multiple operating systems may potentially be run concurrently by computer system 1200. Each virtual machine generally runs independently of the other virtual machines.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to establish a communication channel to one or more client computing devices via the Internet for receiving and sending information from and to the client computing devices.

Communication subsystem 1224 may support both wired and/or wireless communication protocols. For example, in certain embodiments, communications subsystem 1224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1224 can provide wired network connectivity (e.g., Ethernet) in addition to or instead of a wireless interface.

Communication subsystem 1224 can receive and transmit data in various forms. For example, in some embodiments, communications subsystem 1224 may receive input communication in the form of structured and/or unstructured data feeds 1226, event streams 1228, event updates 1230, and the like. For example, communications subsystem 1224 may be configured to receive (or send) data feeds 1226 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1224 may be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1200 depicted in FIG. 12 is intended only as a specific example. Many other configurations having more or fewer components than the system depicted in FIG. 12 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A method comprising:
identifying a compliance policy for using a remote device with an enterprise computer system, wherein the remote device is registered to access the enterprise computer system;
detecting, based on the compliance policy, a non-compliance of the remote device;
assessing, by a computer system, based on the compliance policy, a level of non-compliance of the remote device;
establishing, based on the compliance policy and the level of non-compliance, a time period for remediation of the non-compliance;
receiving a request to access a computing resource in the enterprise computer system;
providing access to the computing resource based on the level of non-compliance;
inhibiting access to the computing resource in the enterprise computer system based on the level of non-compliance and based on determining that the time period for remediation of the non-compliance has expired; and
instructing the remote device to perform an action to remedy the non-compliance based on determining that the time period for remediation of the non-compliance has expired.

2. The method of claim 1, wherein the compliance policy indicates the action to remedy the non-compliance and indicates a time period for performing the action.

3. The method of claim 1, wherein the compliance policy indicates a condition for the non-compliance, and wherein the condition is based on a first user role, and wherein the compliance policy identifies the time period for remediation of the non-compliance and the action for remedying the non-compliance based on determining that the condition is satisfied.

4. The method of claim 3, further comprising:
identifying a user role associated with an identity of a user of the remote device, the user role enabling the identity to access the enterprise computer system; and
determining that the condition is satisfied based on the user role matching the first user role.

5. The method of claim 3, further comprising:
determining one or more device attributes of the remote device and a geolocation of the remote device, wherein the condition is further based on a remote device attribute and a remote device geolocation; and
determining that the condition is satisfied based on the remote device attribute matching a device attribute of the remote device and based on the geolocation of the remote device matching the remote device geolocation.

6. The method of claim 1, wherein the non-compliance of the remote device includes altering a hardware configuration of the remote device.

7. The method of claim 1, wherein the non-compliance of the remote device includes installing a blacklisted application on the remote device.

8. The method of claim 1, wherein the non-compliance of the remote device includes use of the remote device in a manner that is non-compliant with a policy related to registration of the remote device to access the enterprise computer system.

9. The method of claim 1, wherein the non-compliance of the remote device includes adjusting a security configuration of the remote device in a manner that is non-compliant with a security policy for accessing the enterprise computer system.

10. The method of claim 1, further comprising:
wherein access to the computing resource is provided based on determining that the level of non-compliance satisfies a compliance threshold, and wherein access to the computing resource is inhibited based on determining that the level of non-compliance does not satisfy a compliance threshold.

11. The method of claim 1, further comprising:
identifying a second compliance policy for using the remote device with the enterprise computer system, wherein the compliance policy is a first compliance policy that is different from the second compliance policy;
detecting a second non-compliance of the remote device based on the second compliance policy; and
wherein the time period for remediation of the non-compliance is established based on selecting a first time period from one of the first compliance policy or the second compliance policy.

12. The method of claim 11, further comprising:
assessing, based on the second compliance policy, a second level of non-compliance of the remote device, wherein the level of non-compliance corresponds to a first level of non-compliance, and wherein the time period for remediation of the non-compliance is selected based on comparing the first level of non-compliance or the second level of non-compliance.

13. The method of claim 1, wherein the action includes preventing access to use of the remote device with the enterprise computer system.

14. The method of claim 1, wherein the action includes altering registration of the remote device to access the enterprise computer system.

15. A system comprising:
one or more processors; and
a memory storing instructions that, when executed by the one or more processors, cause the one or more processors to:
identify a compliance policy for using a remote device with an enterprise computer system, wherein the remote device is registered to access the enterprise computer system;
detect, based on the compliance policy, a non-compliance of the remote device;
assess, by a computer system, based on the compliance policy, a level of non-compliance of the remote device;
establish, based on the compliance policy and the level of non-compliance, a time period for remediation of the non-compliance;
receive a request to access a computing resource in the enterprise computer system;
provide access to the computing resource based on the level of non-compliance;
inhibit access to the computing resource in the enterprise computer system based on the level of non-compliance and based on determining that the time period for remediation of the non-compliance has expired; and
instruct the remote device to perform an action to remedy the non-compliance based on determining that the time period for remediation of the non-compliance has expired.

16. The system of claim 15, wherein the instructions, when executed by the one or more processors, further cause the one or more processors to:
identify a second compliance policy for using the remote device with the enterprise computer system, wherein the compliance policy is a first compliance policy that is different from the second compliance policy;
detect a second non-compliance of the remote device based on the second compliance policy; and
assess, based on the second compliance policy, a second level of non-compliance of the remote device, wherein the level of non-compliance corresponds to a first level of non-compliance, and
wherein the time period for remediation of the non-compliance is established based on selecting a first time period from one of the first compliance policy or the second compliance policy.

17. A method comprising:
identifying a compliance policy for using a remote device with an enterprise computer system, wherein the remote device is registered to access the enterprise computer system;
detecting, by a computer system, a non-compliance of the remote device based on the compliance policy;
categorizing the non-compliance into a level of non-compliance based on the compliance policy and establishing a time period for remediation of the non-compliance;

allowing access to a first computing resource in the enterprise computer system despite the level of non-compliance;

inhibiting access to a second computing resource in the enterprise computer system based on the level of non-compliance;

determining that the time period for remediation of the non-compliance has passed;

inhibiting access to the first computing resource in the enterprise computer system based on the level of non-compliance and based on determining that the time period for remediation of the non-compliance has passed; and transmitting a message to the remote device based on determining that the time period for remediation of the non-compliance has passed, wherein the message instructs the remote device to automatically remedy the non-compliance.

18. The method of claim 17, wherein the time period for remediation of the non-compliance is stored with the compliance policy and is established based on the level of non-compliance.

19. The method of claim 17, wherein the compliance policy is a first compliance policy associated with a user role for accessing the enterprise computer system, and wherein the method further comprises:

identifying a second compliance policy for using the remote device to access the enterprise computer system;

observing a second non-compliance of the remote device based on the second compliance policy; and selecting the time period for remediation of the non-compliance, the time period for remediation of the non-compliance being selected as a first time period from the first compliance policy for implementation over a second time period of the second compliance policy.

* * * * *

UNITED STATES PATENT AND TRADEMARK OFFICE
CERTIFICATE OF CORRECTION

PATENT NO. : 9,749,311 B2
APPLICATION NO. : 14/690045
DATED : August 29, 2017
INVENTOR(S) : Jayanti Venkata et al.

It is certified that error appears in the above-identified patent and that said Letters Patent is hereby corrected as shown below:

On the Title Page

Column 1, under Title, Line 1, delete "POLICY BASED" and insert -- POLICY-BASED --, therefor.

On page 3, Column 1, under Other Publications, Line 6, delete "/guestions/" and insert -- /questions/ --, therefor.

In the Specification

In Column 1, Line 1, delete "POLICY BASED" and insert -- POLICY-BASED --, therefor.

In Column 39, Line 3, delete "Ski® navigator)," and insert -- Siri® navigator), --, therefor.

Signed and Sealed this
Twenty-ninth Day of May, 2018

Andrei Iancu
*Director of the United States Patent and Trademark Office*